United States Patent [19]
Yamane et al.

[11] Patent Number: 5,467,135
[45] Date of Patent: Nov. 14, 1995

[54] APPARATUS AND METHOD FOR MOVING PICTURE CODING

[75] Inventors: Yasuhiko Yamane, Moriguchi; Masakazu Nishino, Kashiwara; Yuji Fujiwara, Nishinomiya; Toyohiko Matuda, Katano, all of Japan

[73] Assignee: Matsushita Electric Industrial Co., Ltd., Osaka, Japan

[21] Appl. No.: 199,630

[22] Filed: Feb. 22, 1994

[30] Foreign Application Priority Data

Feb. 22, 1993 [JP] Japan .................................. 5-031601
Feb. 25, 1993 [JP] Japan .................................. 5-035971

[51] Int. Cl.⁶ .................................................. H04N 7/32
[52] U.S. Cl. ............................................ 348/415; 348/416
[58] Field of Search .................................. 348/699, 401, 348/402, 409, 412, 413, 415, 416; H04N 7/37

[56] References Cited

U.S. PATENT DOCUMENTS

| | | | |
|---|---|---|---|
| 4,924,310 | 5/1990 | von Brandt | 348/416 |
| 5,262,856 | 11/1993 | Lippman | 348/416 |
| 5,311,310 | 5/1994 | Jozawa | 348/416 |

FOREIGN PATENT DOCUMENTS

| | | |
|---|---|---|
| 0405842 | 6/1990 | European Pat. Off. . |
| 0414113 | 8/1990 | European Pat. Off. . |
| 25689 | 10/1990 | Japan . |
| 5199512 | 6/1993 | Japan . |

OTHER PUBLICATIONS

"Differential Estimation of the Global Parameters Zoom and Pan", by M. Hoetter, vol. 16, No. 3, Mar. 1989, Amsterdam/Netherlands, pp. 249–265.

"An Edge Detection Approach to Digital Image Stabilization Based on Tri–State Adaptive Linear Neurons", by Joon Ki Paik et al., IEEE Transaction on Consumer Electronics, vol. 37, No. 3, Aug. 1991, New York/USA, pp. 521–529.

*Primary Examiner*—Howard W. Britton
*Attorney, Agent, or Firm*—Price, Gess & Ubell

[57] ABSTRACT

A method of coding image data with coefficients between fields by increasing the coefficients prior to coding comprising the steps of: (1) detecting a motion vector in a reference field to a sample field to check whether the reference field is zoomed in or out relative to the sample field, data of the reference field being coded based on the sample field; (2) zooming out the reference field when the reference field is zoomed in relative to the sample field, and zooming in the reference field when the reference field is zoomed out relative to the sample field according to the motion vector; and (3) coding the reference field after the reference field has been zoomed according to the motion vector in the second step. In the second step, the reference field may be zoomed out by eliminating pixels that are not adjacent in one of a vertical direction and a horizontal direction.

54 Claims, 22 Drawing Sheets

$Vv(y) = av \cdot y + bv$ $Vh(x) = ah \cdot x + bh$ $Vv(y) = av \cdot y + bv$ $Vh(x) = ah \cdot x + bh$

SAMPLE POINT'S
MOTION VECTOR

BLOCK0 : $V(x_0, y_0)$

BLOCK1 : $V(x_1, y_1)$

BLOCK2 : $V(x_2, y_2)$

BLOCK3 : $V(x_3, y_3)$

FIG. 9

$$HSx = VLINE \cdot \sum_{x=0}^{HPIX-1} x \quad \cdots (3)$$

$$HSx^2 = VLINE \cdot \sum_{x=0}^{HPIX-1} x^2 \quad \cdots (4)$$

$$HSy = (HPIX/2)(VLINE/2) \sum_{i=0}^{3} V(x_i) \quad \cdots (5)$$

$$HSxy = (VLINE/2) \left[ \sum_{x=0}^{HPIX/2-1} xV(x_0) + \sum_{x=HPIX/2}^{HPIX} xV(x_1) \right.$$
$$\left. + \sum_{x=0}^{HPIX/2-1} xV(x_2) + \sum_{x=HPIX/2}^{HPIX} xV(x_3) \right] \cdots (6)$$

$$ah = \frac{HSxy \cdot HPIX \cdot VLINE - HSx \cdot HSy}{HSx^2 \cdot HPIX \cdot VLINE - HSx \cdot HSx} \quad \cdots (7)$$

$$bh = \frac{HSxy - ah \cdot HSx}{HPIX \cdot VLINE} \quad \cdots (8)$$

FIG. 10

$$VSy = HPIX \cdot \sum_{y=0}^{VLINE-1} y \qquad \cdots (9)$$

$$VSy^2 = HPIX \cdot \sum_{y=0}^{VLINE-1} y^2 \qquad \cdots (10)$$

$$VSx = (VLINE/2)(HPIX/2) \sum_{i=0}^{3} V(y_i) \qquad \cdots (11)$$

$$VSyx = (HPIX/2) [\sum_{y=0}^{VLINE/2-1} yV(y_0) + \sum_{y=VLINE/2}^{VLINE} yV(y_1) + \sum_{y=0}^{VLINE/2-1} yV(y_2) + \sum_{y=VLINE/2}^{VLINE} yV(y_3)] \cdots (12)$$

$$av = \frac{VSyx \cdot VLINE \cdot HPIX - VSy \cdot VSx}{VSy^2 \cdot VLINE \cdot HPIX - VSy \cdot VSy} \qquad \cdots (13)$$

$$bv = \frac{VSyx - av \cdot VSy}{VLINE \cdot HPIX} \qquad \cdots (14)$$

FIG. 13A $[av(y_1)+bv] \leftarrow y_1$
$[av(y_2)+bv] \leftarrow y_2$
$[av(y_3)+bv] \leftarrow y_3$
$[av(y_4)+bv] \leftarrow y_4$

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 | ELIMINATED
| 20 | 21 | 22 | 23 | 24 | 25 | 26 | 27 | 28 | 29 |
| 30 | 31 | 32 | 33 | 34 | 35 | 36 | 37 | 38 | 39 |

FIG. 13B $[av(y_3)+bv]$
$[av(y_1)+bv]$
$[av(y_2)+bv]$
$[av(y_4)+bv]$
WRITTEN ON

| 00 | 01 | 02 | 03 | 04 | 05 | 06 | 07 | 08 | 09 |
|----|----|----|----|----|----|----|----|----|----|
| 20 | 21 | 22 | 23 | 24 | 25 | 26 | 27 | 28 | 29 |
| 30 | 31 | 32 | 33 | 34 | 35 | 36 | 37 | 38 | 39 |
|    |    |    |    |    |    |    |    |    |    |

FIG. 13C $+2\begin{cases}[-av(y_1)-bv] \leftarrow y_1 \\ [-av(y_2)-bv] \leftarrow y_2\end{cases}$
$[-av(y_3)-bv] \leftarrow y_3$

| 00 | 01 | 02 | 03 | 04 | 05 | 06 | 07 | 08 | 09 |
|----|----|----|----|----|----|----|----|----|----|
| 20 | 21 | 22 | 23 | 24 | 25 | 26 | 27 | 28 | 29 |
| 30 | 31 | 32 | 33 | 34 | 35 | 36 | 37 | 38 | 39 |
|    |    |    |    |    |    |    |    |    |    |

FIG. 13D $[-av(y_1)-bv]$
$[-av(y_2)-bv]$
$[-av(y_3)-bv]$

| 00 | 01 | 02 | 03 | 04 | 05 | 06 | 07 | 08 | 09 | REFERENCE PIXEL
| 10 | 11 | 12 | 13 | 14 | 15 | 16 | 17 | 18 | 19 | INTERPOLATION
| 20 | 21 | 22 | 23 | 24 | 25 | 26 | 27 | 28 | 29 | REFERENCE PIXEL
| 30 | 31 | 32 | 33 | 34 | 35 | 36 | 37 | 38 | 39 |

FIG. 14A $[av(y_1)+bv] \leftarrow y_1$
$[av(y_2)+bv] \leftarrow y_2$
$[av(y_3)+bv] \leftarrow y_3$
$[av(y_4)+bv] \leftarrow y_4$

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |

ELIMINATED

O E O E O E O E O E ← ODD/EVEN

FIG. 14B $[av(y_3)+bv]$
$[av(y_1)+bv]$
$[av(y_2)+bv]$
$[av(y_4)+bv]$

WRITTEN ON WHEN ODD

| 00 | 01 | 02 | 03 | 04 | 05 | 06 | 07 | 08 | 09 |
|----|----|----|----|----|----|----|----|----|----|
| 20 | 21 | 22 | 23 | 24 | 25 | 26 | 27 | 28 | 29 |
| 30 | 31 | 32 | 33 | 34 | 35 | 36 | 37 | 38 | 39 |

O E O E O E O E O E ← ODD/EVEN

FIG. 14C $[-av(y_1)-bv] \leftarrow y_1$
$+2 \{ [-av(y_2)-bv] \leftarrow y_2$
$[-av(y_3)-bv] \leftarrow y_3$

| 00 | 01 | 02 | 03 | 04 | 05 | 06 | 07 | 08 | 09 |
|----|----|----|----|----|----|----|----|----|----|
| 20 | 21 | 22 | 23 | 24 | 25 | 26 | 27 | 28 | 29 |
| 30 | 31 | 32 | 33 | 34 | 35 | 36 | 37 | 38 | 39 |

O E O E O E O E O E ← ODD/EVEN

FIG. 14D $[-av(y_1)-bv]$
EVEN $[-av(y_2-1)-bv]+1$
ODD $[-av(y_2-1)-bv]+2$
$[-av(y_3)-bv]$

| ⓪⓪ | 01 | ⓪② | 03 | ⓪④ | 05 | ⓪⑥ | 07 | ⓪⑧ | 09 |
|----|----|----|----|----|----|----|----|----|----|
| 10 | ⑪ | 12 | ⑬ | 14 | ⑮ | 16 | ⑰ | 18 | ⑲ |
| ⑳ | 21 | ㉒ | 23 | ㉔ | 25 | ㉖ | 27 | ㉘ | 29 |
| 30 | ㉛ | 32 | ㉝ | 34 | ㉟ | 36 | ㊲ | 38 | ㊴ |

REFERENCE PIXEL
INTERPOLATION

O E O E O E O E O E ← ODD/EVEN

FIG. 17A $$+2\begin{cases}[av(y_1)+bv] \leftarrow y_1 \\ [av(y_2)+bv] \leftarrow y_2\end{cases}$$
$$+1\begin{cases}[av(y_3)+bv] \leftarrow y_3\end{cases}$$
$$+1\begin{cases}[av(y_4)+bv] \leftarrow y_4\end{cases}$$

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |

FIG. 17B

| | 00 | 01 | 02 | 03 | 04 | 05 | 06 | 07 | 08 | 09 |
|---|----|----|----|----|----|----|----|----|----|----|
| $[av(y_1)+bv]$ | 00 | 01 | 02 | 03 | 04 | 05 | 06 | 07 | 08 | 09 |
| | | | | | | | | | | | ← INTERPOLATION
| $[av(y_2)+bv]$ | 10 | 11 | 12 | 13 | 14 | 15 | 16 | 17 | 18 | 19 |
| $[av(y_3)+bv]$ | 20 | 21 | 22 | 23 | 24 | 25 | 26 | 27 | 28 | 29 |

FIG. 17C

| | 00 | 01 | 02 | 03 | 04 | 05 | 06 | 07 | 08 | 09 |
|---|----|----|----|----|----|----|----|----|----|----|
| $[-av(y_1)-bv] \leftarrow y_1$ | 00 | 01 | 02 | 03 | 04 | 05 | 06 | 07 | 08 | 09 |
| $[-av(y_2)-bv] \leftarrow y_2$ | | | | | | | | | | |
| $[-av(y_3)-bv] \leftarrow y_3$ | 10 | 11 | 12 | 13 | 14 | 15 | 16 | 17 | 18 | 19 |
| $[-av(y_3)-bv] \leftarrow y_4$ | 20 | 21 | 22 | 23 | 24 | 25 | 26 | 27 | 28 | 29 |

FIG. 17D $[-av(y_3)-bv]$
$[-av(y_1)-bv]$
$[-av(y_2)-bv]$
$[-av(y_4)-bv]$
WRITTEN ON

| 00 | 01 | 02 | 03 | 04 | 05 | 06 | 07 | 08 | 09 |
|----|----|----|----|----|----|----|----|----|----|
| 10 | 11 | 12 | 13 | 14 | 15 | 16 | 17 | 18 | 19 |
| 20 | 21 | 22 | 23 | 24 | 25 | 26 | 27 | 28 | 29 |
|    |    |    |    |    |    |    |    |    |    | ← INTERPOLATION

APPARATUS AND METHOD FOR MOVING PICTURE CODING

BACKGROUND OF THE INVENTION

1. Field of the Invention

The present invention relates to an apparatus and method for coding and decoding moving pictures using coefficients between frames or fields, and more particularly, to a high-efficient apparatus and method for coding and decoding a sequence of moving pictures that contains zoomed images.

2. Description of the Related Arts

In recent years, a variety of techniques have been developed in the field of image digitization. Because an image is converted into a massive amount of data, the image data must be compressed, or reduced in volume, to be recorded or transmitted efficiently. For example, a digital video tape recorder for a HDTV (High-Definition Television) is furnished with a function that codes and decoders an enormous amount of image data of moving pictures.

FIG. 1A is a block diagram showing a structure of a conventional coding unit. More precisely, numeral 1000 is an image input unit used to input image data per frame that makes up moving pictures. Numerals 1001, 1002 are frame memories for temporarily storing image data of two continuous frames, for example, frames #0, #1, respectively. The frame referred herein is the data of one image that collectively makes up the moving pictures; in case of an interlace display, the frame is a field consisting of alternative scanning lines. Numeral 1003 is an adder for computing a total of image data pixel values in the frame memories 1001, 1002. Numeral 1004 is a subtracter for computing a balance between the image data pixel values in the frame memories 1001, 1002. Numeral 1005 is a selector for selecting an output frame either the adder 1003 or subtracter 1004. Numeral 1006 is a discrete cosine transform (DCT) unit for dividing a frame formed on the output from the selector 1005 into a set of 8×8 pixel array blocks to analyze each block's frequency. Numeral 1007 is a quantization unit for quantizing the frequency into an array using a quantization table which specifies an adequate quantization method for each frequency. Numeral 1008 is a variable length coding (VLC) unit for outputting coded data by converting the quantization frequency array into variable length codes; this process is also known as "entropy coding".

The above-described coding unit converts original image data into the coded data by the following steps of (1) dividing a frame formed on the total or balance of two continuous frames' image data into a set of 8×8 pixel array blocks; (2) computing coefficients between the two frames with an orthogonal transform; (3) quantizing the coefficients first, and then converting the quantization coefficients into variable length codes.

FIG. 1B is a block diagram depicting a structure of a conventional decoding unit, which operates in a reversed manner to the above-described conventional coding unit, thereby decoding the coded data back into the original image data.

More specifically, numeral 1109 is an input unit used to input the coded data. Numeral 1108 is a variable length decoding (VLD) unit for converting the coded data into the quantization frequency array. Numeral 1107 is a dequantization unit for dequantizing the quantization frequency array into the frequency using the quantization table. Numeral 1106 is an inverse DCT unit for converting the frequency to the two frame's image data, and subsequently computing the total and balance of the image data per 8×8 pixel array block with an inverse DCT. Numerals 1105, 1104 are frame memories for respectively storing the total and balance of the image data entering from the inverse DCT unit 1106. Numeral 1103 is an adder for adding the total and balance of the image data per pixel in the frame memories 1105, 1104. Numeral 1102 is a subtracter for subtracting the total and balance of the image data per pixel in the frame memories 1105, 1104. Note that the output from the adder 1103 and subtracter 1102 are the image data of the frames #0, #1, respectively. Numeral 1101 is a selector and shifter for shifting between the adder 1103 and subtracter 1102 to select their outputs in turn.

The above-described decoding unit decodes the coded data back into the original image data by the following steps of (1) decoding the coded data into the quantization frequency array; (2) computing the total and balance of the two frames' image data with de-quantization and inverse DCT per 8×8 pixel array block; (3) storing the total and balance of the image data first, and then adding or subtracting the total and balance of the image data per pixel.

The conventional coding apparatus, however, is not efficient when a sequence of pictures contains zoomed frames. This is because compression efficiency is directly proportional to the coefficients between the two frames (inversely proportional to the image data balance), and the coefficients become smaller when one of the images is zoomed.

Also, the conventional coding unit has a problem in maintaining the image quality in a reproduced image. More precisely, the conventional coding unit is typically used for the digital VTRs or data transmission via a telephone line, where the coded data transmitted per time unit is limited. For example, assume that a VTR has a capacity of 50 Mbps and it records 30 frames of video per second, then the volume should be less than 1.67 Mbit/frame. Therefore, when the volume exceeds that limit, the quantization unit 1007 reduces the volume before it transmits the image data to the VLC unit 1008. Thus, the decoded data contains less image data and an image is reproduced on the less image data, resulting in a degraded image quality. In other words, under the present conditions, the image data are compressed at the expense of the image quality.

SUMMARY OF THE INVENTION

Accordingly, the present invention has a first object to provide an apparatus and method for coding image data efficiently independently of the zoomed frames.

The present invention has a second object to provide an apparatus and method for coding image data without impairing the image quality.

The present invention has a third object to provide an apparatus and method for decoding the coded data generated by the coding apparatus and method of the present invention.

The first object is fulfilled by a method of coding image data with coefficient between fields by increasing the coefficients prior to coding. The method comprising the steps of:

(1) detecting a motion vector in a reference field to a sample field to check whether the reference field is zoomed in or out relative to the sample field, data of the reference field being coded based on the sample field;

(2) zooming out the reference field when the reference field is zoomed in relative to the sample field, and zooming in the reference field when the reference field is zoomed out relative to the sample field according to the motion vector; and (3) coding the reference field after the references field has been zoomed according to the motion vector in the second step.

The reference field may be zoomed according to a direction and a size of the motion vector in the second step.

The first step may further include the substep of checking whether the reference field is zoomed in or out relative to the sample field based on a direction of the motion vector.

The second step may include the substeps of:

generating a second pixel address in a zoomed reference field according to the size and direction of the motion vector, the second pixel address mapping to a first pixel address in the reference field; and reading out pixel data at the first pixel address from the reference field to write the pixel data at the second pixel address.

Also, the first object is fulfilled by a coding apparatus for coding image data with coefficients between fields by increasing the coefficients prior to coding; the apparatus comprising: a unit for temporarily storing a sample field; a unit for temporarily storing a reference field which is to be coded based on the sample field; a unit for detecting a motion vector in the reference field to the sample field to determine whether the reference field is zoomed in or out relative to the sample field; a unit for zooming in the reference field when the reference field is zoomed out relative to the sample field, and for zooming out the reference field when the reference field is zoomed in relative to the sample field according to the motion vector; and a unit for coding the reference field after it has been zoomed according to the motion vector.

The zooming unit may zoom in the reference field according to a direction and a size of the motion vector.

The detecting unit may further include: a unit for checking whether the reference field is zoomed in or out relative to the sample field based on a direction of the motion vector.

The zooming unit may include; a unit for generating a second pixel address in a zoomed reference field according to the size and direction of the motion vector, the second pixel address mapping to a first pixel address in the reference field; and a unit for reading out pixel data at the first pixel address from the reference field storage unit to write the pixel data at the second pixel address.

According to the above coding method and apparatus, the reference field is coded efficiently when the reference field is zoomed relative to the sample field; for the coefficients between the sample and reference fields are increased in the pre-coding process.

The second object is fulfilled by a method of coding image data with coefficients between fields by increasing the coefficients prior to coding. The method comprising the steps of:

(1) detecting a motion vector in a reference field to a sample field to check whether the reference field is zoomed in or out relative to the sample field, data of the reference field being coded based on the sample field;

(2) zooming out the reference field when the reference field is zoomed in relative to the sample field, and zooming in the reference field when the reference field is zoomed out relative to the sample field according to the motion vector; and (3) coding the reference field after the reference field has been zoomed according to the motion vector in the second step.

The reference field may be zoomed out by eliminating pixels that are not adjacent in one of a vertical direction and a horizontal direction in the second step.

Pixels in one line and one of a vertically and a horizontally adjacent line may be eliminated in zig-zag in the second step.

Pixels may be interpolated with a reference to neighboring pixel data when the reference field is zoomed in in the second step.

Pixels may be interpolated with a reference to corresponding pixel data in an adjacent field within the group in the second step.

The second object is also fulfilled by a coding apparatus for coding image data with coefficient between fields by increasing the coefficients prior to coding. The apparatus comprising: a unit for temporarily storing a sample field; a unit for temporarily storing a reference field which is to be coded based on the sample field; a unit for detecting a motion vector in the reference field to the sample field to determine whether the reference field is zoomed in or out relative to the sample field; a unit for zooming in the reference field when the reference field is zoomed out relative to the sample field, and for zooming out the reference field when the reference field s zoomed in relative to the sample field according to the motion vector; and a unit for coding the reference field after it has been zoomed according to the motion vector.

The zooming unit may zoom out the reference field by eliminating pixels that are not adjacent in one of a horizontal direction and a horizontal direction.

The zooming unit may eliminate pixels in one line and one of a vertically and horizontally adjacent line in zig-zag.

The zooming unit may interpolate pixels by referring to neighboring pixel data when the zooming unit zooms in the reference field.

The zooming unit may interpolate pixels by referring to corresponding pixel data in an adjacent field in the group.

According to the above coding method and apparatus, adjacent pixels are not eliminated when the reference field is zoomed out in the pre-coding process, the coded data loses substantially no original image data, increasing the image quality in a reproduced image.

The third object is fulfilled by a method of decoding coded data with zoom coefficients between fields when image data have been coded by a coding method which increases the coefficients prior to coding. The method comprising the steps of:

(1) decoding coded data into field data;

(2) generating a first pixel address in a decoded field and a second pixel address mapping to the first pixel address in a zoomed decoded field with the zoom coefficients;

(3) reading out pixel data at the first pixel address from the decoded field to write the pixel data at the second pixel address to zoom the decoded field;

(4) generating a third pixel address at which pixel data are interpolated when the decoded field is zoomed in; and (5) interpolating the pixel data at the third pixel address.

The third object is also fulfilled by an apparatus of decoding coded data with zoom coefficients between fields when image data have been coded by a coding method which increases the coefficients prior to coding. The apparatus comprising: a unit for decoding coded data into field data; a unit for temporarily storing data of one decoded field; a unit for temporarily storing the zoom coefficients associated with the decoded field data in the decoded-field-data storage unit; a unit for generating a first pixel address in the decoded field and a second pixel address with the coefficients, the second pixel mapping to the first pixel address in a zoomed decoded field; a unit for reading out pixel data at the first pixel address from the decoded-field-data storage unit to write the pixel data at the second pixel address to zoom the decoded field; a unit for generating a third pixel address at which pixel data are interpolated when the decoded field is zoomed in; and a unit for interpolating the pixel data at the third pixel address.

BRIEF DESCRIPTION OF THE DRAWING

These and other objects, advantages and features of the invention will become apparent from the following description thereof taken in conjunction with the accompanying drawings which illustrate a specific embodiment of the invention. In the drawings:

FIG. 9 shows equations used for computing horizontal parameters and zoom coefficients;

FIG. 10 shows equations used for computing vertical parameters and zoom coefficients;

FIGS. 13A through 13D are views explaining a principle of a zoom process with the zoom coefficients;

FIGS. 14A through 14D are views explaining a zoom-out process of the pre-coding processing unit and a zoom-in process of the post-coding processing unit;

FIGS. 17A through 17D are views explaining a zoom-in operation of the pre-coding processing unit and a zoom-out process of the post-coding processing unit;

DESCRIPTION OF THE PREFERRED EMBODIMENT

Figure 1A:
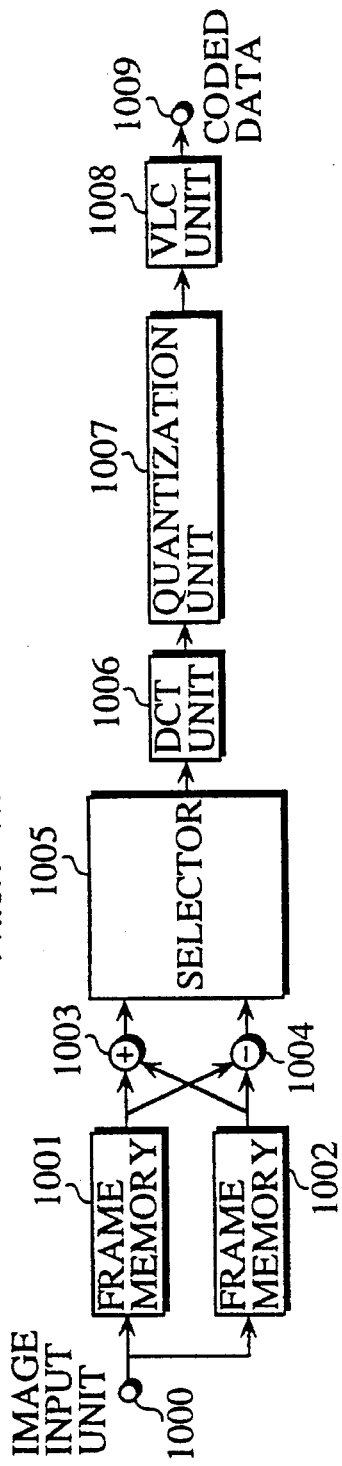
FIG. 1A is a block diagram depicting a structure of a conventional coding unit.
Figure 1B:
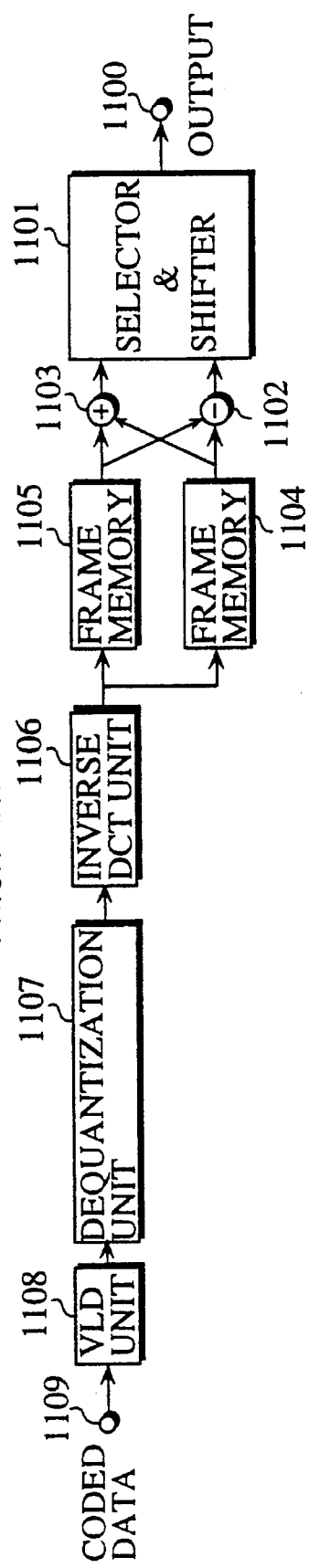
FIG. 1B is a block diagram depicting a structure of a conventional decoding unit.
Figure 2:
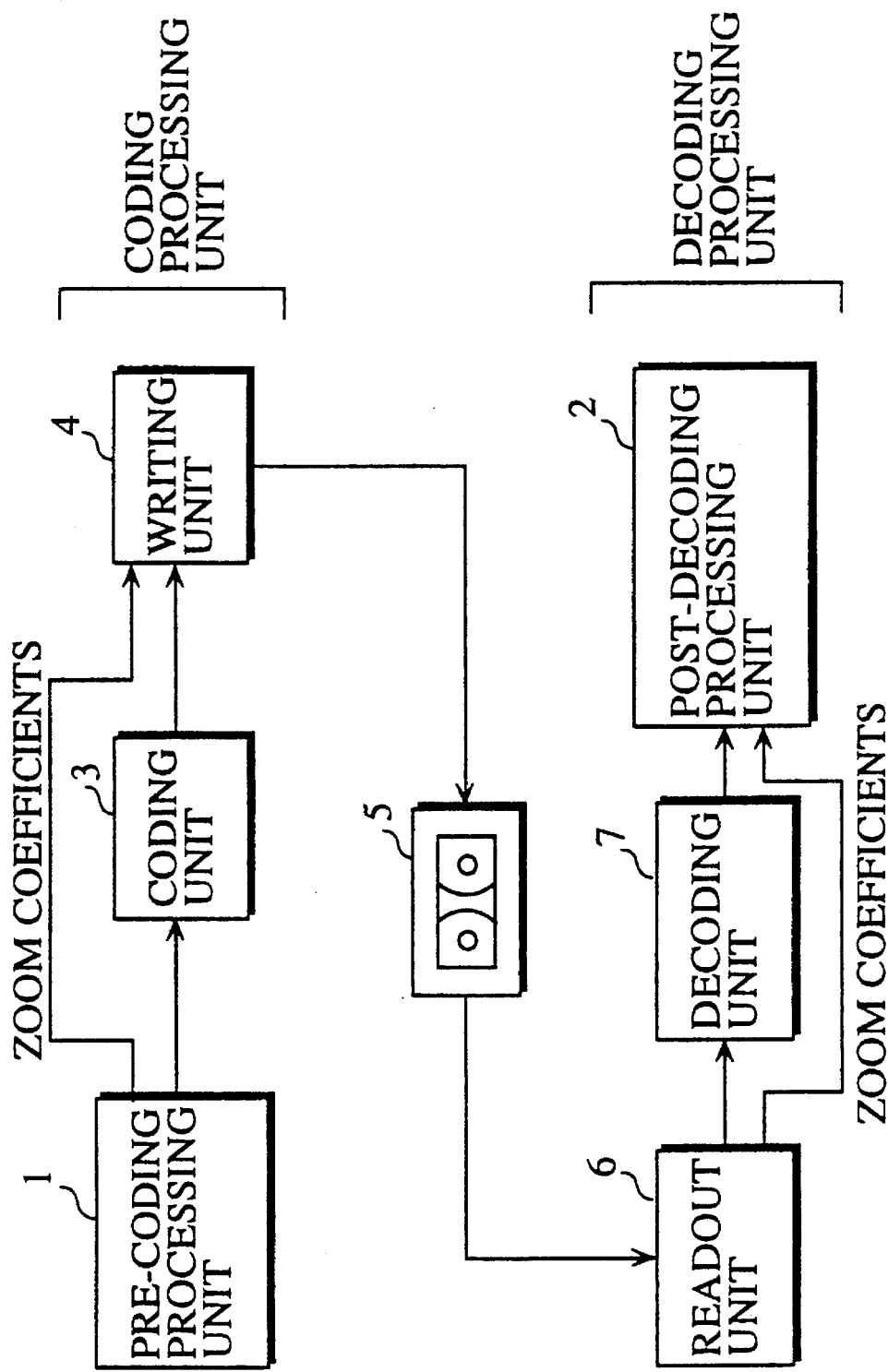
FIG. 2 is block diagram depicting a structure of an image recording apparatus incorporating a coding unit and a decoding unit of the present invention.

FIG. 2 is a block diagram showing a structure of an image forming apparatus incorporating a coding processing unit and a decoding processing unit of the present invention. For the use of convenience, assume that the image forming apparatus is a digital VTR and a frame consists of two fields in this embodiment.

The image forming apparatus comprises a pre-coding processing unit 1, a coding unit 3, a writing unit 4, a recording medium 5, a readout unit 6, a decoding unit 7, and a post-decoding processing unit 2. The first three elements compose the coding processing unit for coding image data of original moving pictures per two frames (four fields), while the last three elements composing the decoding processing unit for decoding the coded data back into the original image data, and the recording medium 5 records and stores the coded image data.

More precisely, the pre-coding processing unit 1 checks a field group consisting of a predetermined number of fields, which is four herein; the first field is referred to as a sample field. In other words, the pre-coding processing unit 1 checks whether or not a non-sample field in the field group is zoomed relative to the sample field. If so, the pre-coding processing unit 1 computes zooming coefficients, and resumes a zoomed reference field size to a sample field size; a zoomed-in non-sample field is zoomed out while a zoomed-out non-sample field is zoomed in.

The coding unit 3 compresses the image data entering from the pre-coding processing unit 1 by coding the image data per field group in the same way as the conventional coding unit described in the related arts, and thus the explanation is omitted. The coded image data are simply referred to as code data hereinafter.

The writing unit 4 writes the coded data and zoom coefficients entering respectively from the coding unit 3 and pre-coding processing unit 1 into the recording medium 5, which is a video tape herein. Thus, the writing unit 4 corresponds to a format unit that records the coded data into the video tape. However, if the image forming apparatus is a computer system and the recording medium 5 is a hard or optical disc, the writing unit 4 is a hard or optical disc controller.

Figure 3:
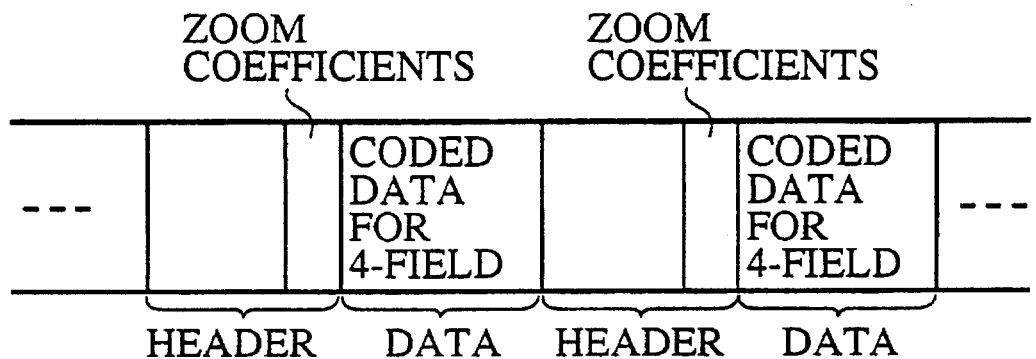
FIG. 3 is an illustration of a recording medium's record format.

The recording medium 5, as has been stated above, is a video tape for a digital VTR and it records and stores the coded data. FIG. 3 is an illustration of a record format of the recording medium 5. The record format consists of a plurality of pairs of a header unit and a data unit; the former stores the zoom coefficients and other control information related to the coded data, and the latter stores the coded data up to four fields.

The readout unit 6 reads out the coded data and zoom coefficients from the recording medium 5. In contrast to the writing unit 4, the readout unit 6 corresponds to a format unit that reproduces the coded data stored in the recording medium 5. If the recording medium is a hard or optical disc, the readout unit 6 is a hard or optical disc controller.

The decoding unit 7 decodes the coded data back into the original image data in the same way as the conventional decoding unit explained in the related art, and thus the explanation is omitted.

The post-decoding processing unit 2 zooms in a non-sample frame when it was zoomed out by the pre-coding processing unit 1, and zooms out when zoomed in using the zoom coefficients.

The gist of the present invention, the pre-coding processing unit 1 and post-decoding processing unit 2, will be explained more in detail.

PRE-CODING PROCESSING UNIT 1

Figure 4:
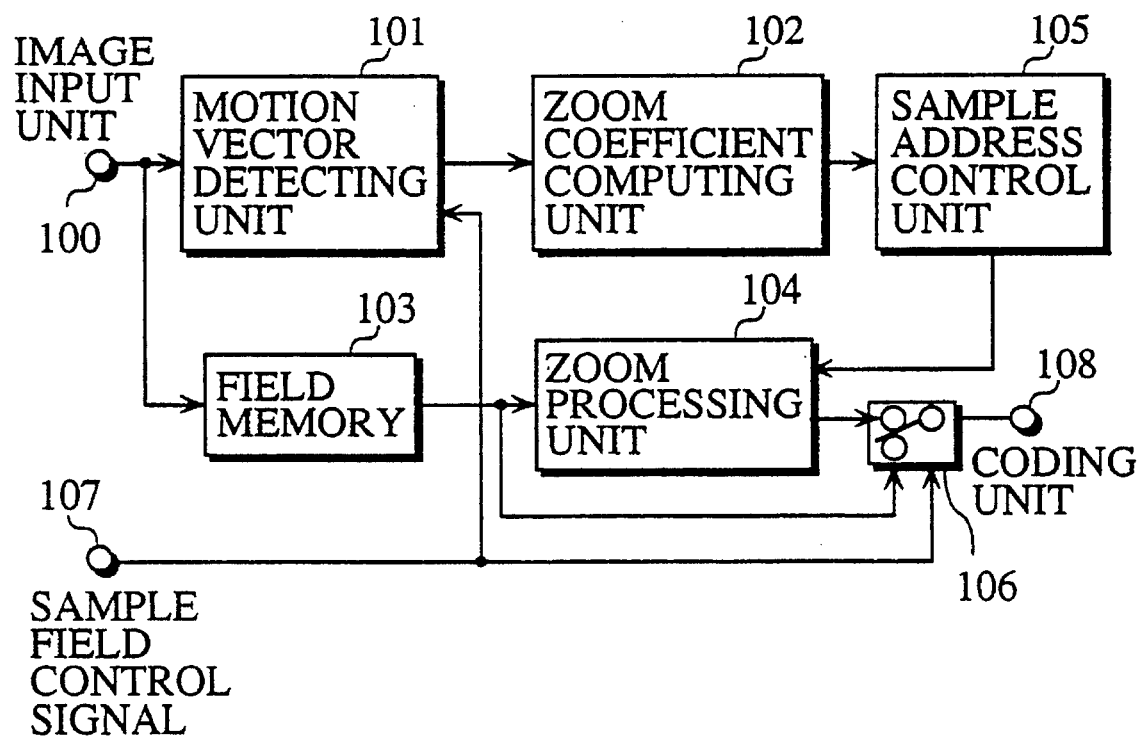
FIG. 4 is a block diagram depicting a pre-coding processing unit in the coding unit.

The pre-coding processing unit 1, whose structure is shown in FIG. 4, resumes a non-sample field size to the sample field size before the non-sample field data are sent to the coding unit. The pre-coding processing unit 1 comprises an image input unit 100, a motion vector detecting unit 101, a zoom coefficient computing unit 102, a field memory 103, a zoom processing unit 104, a sample address control unit 105, a switch unit 106, and an output terminal 108.

Figure 6:
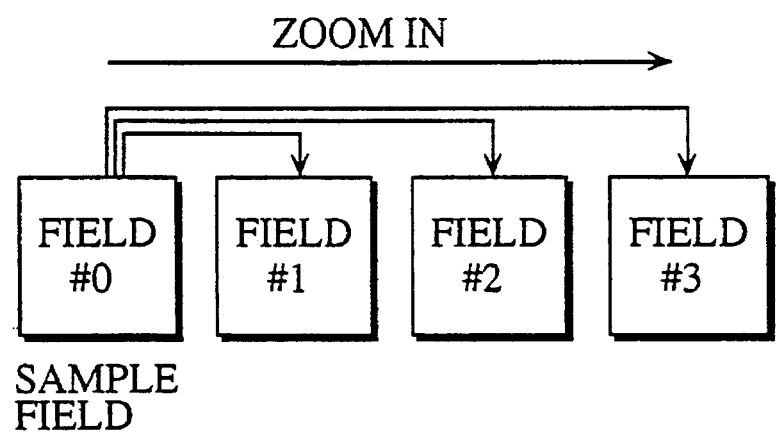
FIG. 6 is an illustration of a field group.

More precisely, the image input unit 100 is used to input field data, which are digitized video signals from a HDTV's receiver herein. FIG. 6 shows an example of the field data. The field data are the field group consisting of four fields, and the first field (#0) is referred to as the sample field, and other three fields (#1–3) are referred to as reference fields which are subject to coding based on the sample field. A plurality of the field groups are inputted per field into the input unit 100; note that each sample field is inputted with a sample field control signal.

Figure 7A:
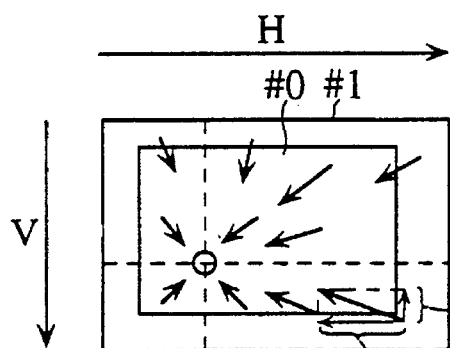
FIGS. 7A through 7F are the illustrations of motion vectors and linear functions approximating the motion vectors.

The motion vector detecting unit 101 detects motion vectors in the reference field. The motion vectors represent a mapping relation between the sample and reference fields. The motion vectors are detected in the same way as disclosed in Japanese Laid-open Patent Application No. 2-5689, which will be explained briefly by referring to FIG. 7A through 7F. First, let a case be an example where the reference field #1 is zoomed in relative to the sample field #0 as shown in FIG. 7A, in which a circle indicates a center of zoom while arrows indicating the motion vectors in the reference field #1 relative to the sample field #0. Then, the motion vector detecting unit 101 divides the two fields into four squares having the center of the zoom as an intersection, and selects a sample point in each square on the reference field #1. Further, the motion vector detecting unit 101 checks the sample points's mapping points on a zoomed-out reference field relative to the sample field #0 to detect the motion vectors.

Figure 7C:
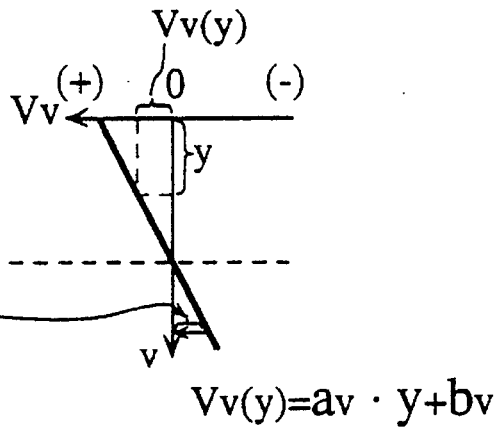
Figure 7B:
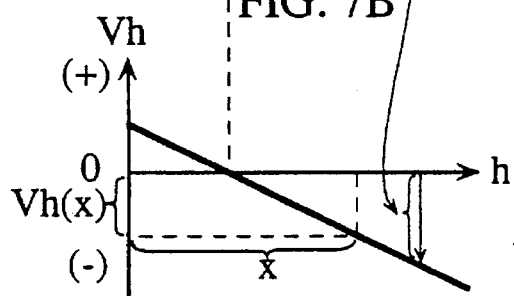

The zoom coefficient computing unit 102 computes zoom coefficients, i.e., coefficients of linear functions, which approximate the horizontal and vertical motion vectors. FIG. 7B shows horizontal linear functions and horizontal zoom coefficients relative to FIG. 7A. Given the horizontal zoom coefficients ($a_h$, $b_h$), a horizontal motion vector $V_h(x)$ located from x pixels away from the center of zoom is expressed as:

$$V_h(x) = a_h \cdot x + b_h \tag{1}$$

Equation (1) explains that a pixel located at x on the reference field #1 maps to a pixel located at $V_h(x)$ in the zoomed-out reference field relative to the sample field #0. FIG. 7C shows the vertical linear function and zoom coefficients relative to FIG. 7A. Given the vertical zoom coefficients ($a_v$, $b_v$), the horizontal vector $V_v(y)$ located from y pixels away from the center of zoom is expressed as:

$$V_v(y) = a_v \cdot y + b_v \tag{2}$$

Equation (2) explains that a pixel located at y on the reference field #1 maps to a pixel located at $V_v(y)$ in the zoom-out reference field relative to the sample field #0. Equations (1), (2) lead to the conclusion that the pixel located at (x, y) on the reference field #1 maps to the pixel located at ($V_h(x)$, $V_v(y)$) in the zoomed-out reference field relative to the sample field #0.

Figure 7D:
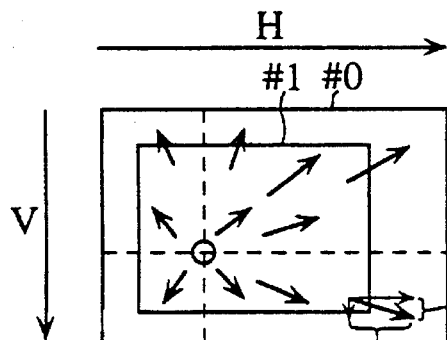
Figure 7F:
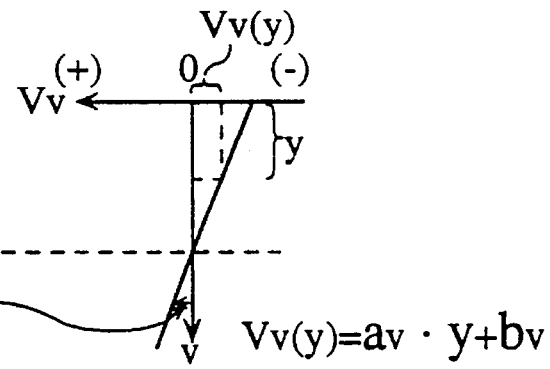
Figure 7E:
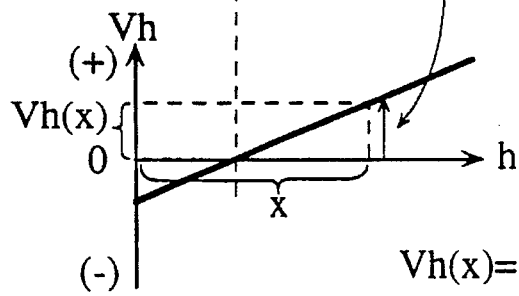

FIGS. 7D through 7F show a case where the reference field #1 is zoomed out, although the expiation is omitted.

To be more specific, a method of computing the horizontal and vertical zoom coefficients will be explained by referring to FIGS. 8A through 10.

Figure 8A:
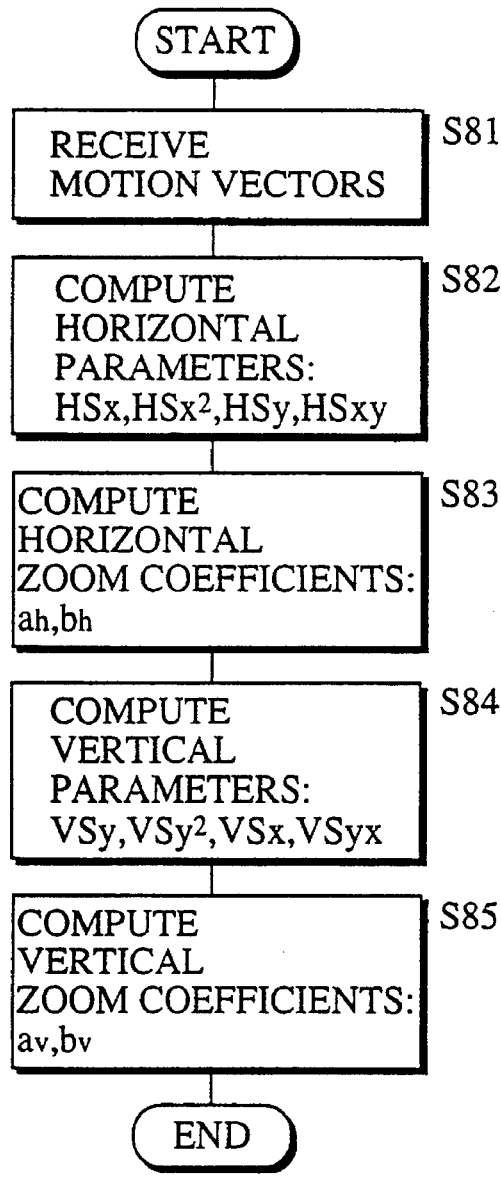
FIG. 8A is a flowchart detailing the operation of a zoom coefficient computing unit.
Figure 8B:
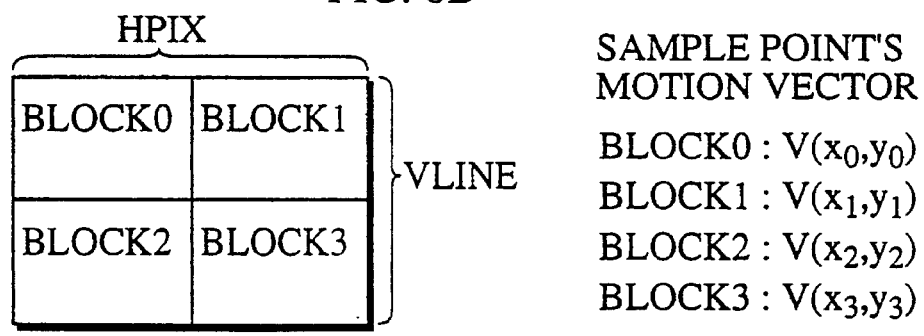
FIG. 8B is a view explaining sample points' motion vectors.

FIG. 8A is a flowchart detailing the operation of the zoom coefficient computing unit 102. To begin with, the zoom coefficient computing unit 102 receives the four sample points' motion vectors from the motion vector detecting unit 101 (Step 81). FIG. 8B shows the motion vectors in the blocks 0–3: $V(x_0, y_0)$ $V(x_1, y_1)$, $V(x_2, y_2)$, $V(x_3, y_3)$, respectively; HPIX represents the number of pixels within one field in the horizontal direction while VLINE representing the number of pixels in the vertical direction, or the number of the scan lines.

The zoom coefficient computing unit 102 computes parameters, HSx, $HSx^2$, HSy, HSxy, which are used to compute the horizontal zoom coefficients using Equations (3)–(6) shown in FIG. 9, respectively (Step 82). HSx is a total of the horizontal coordinates within one field, $HSx^2$ is a total of squares of the horizontal coordinates within one field, HSy is a total of the horizontal motion vectors within one field, and HSxy is a product of the horizontal motion vectors and horizontal coordinates within one field; $V(x_0)$, $V(x_1)$, $V(x_2)$, $V(x_3)$ are elements of the horizontal motion vectors.

Subsequently, the zoom coefficients $a_h$, $b_h$ using 102 computes the horizontal zoom coefficients $a_h$, $b_h$ using Equations (7), (8) shown in FIG. 9, respectively (Step 83). Further, the zoom coefficient computing unit 102 computes vertical parameters, VSy, $VSy^2$, VSx, VSyx, in the same way as the vertical coefficients using Equations (9)–(12) shown in FIG. 10, respectively (Step 84). VSx is a total of the vertical coordinates within one field, $VSx^2$ is a total of squares of the vertical coordinates within one field, VSy is a total of the vertical motion vectors within one field, and VSxy is a product of the vertical motion vectors and vertical coordinates within one field; $V(y_0)$, $V(y_1)$, $V(y_2)$, $V(y_3)$ are elements of the vertical motion vectors.

Subsequently, the zoom coefficient computing unit 102 computes the vertical zoom coefficients $a_v$, $b_v$ in the same way as the horizontal zoom coefficients using Equations (13), (14) shown in FIG. 10, respectively (Step 85).

The field memory 103 receives the image data of one field from the image input unit 100 to temporarily store them.

The zoom processing unit 104 zooms in the a reference field when it is zoomed out related to the sample field, and zooms out otherwise in accordance with an address generated by the sample address generating unit 105. To be more specific, the zoom processor 104 maps the pixels in the reference field to their respective addresses designated by the sample address control unit 105, which are referred to as the sample address hereinafter and the definition will be given later. During the mapping, some pixels are eliminated while the reference field is zoomed out, and some are interpolated when zoomed in. In this way, the zoom processing unit 104 resumes the reference field size to the sample field size, keeping a correlation between the sample and reference fields when the latter is zoomed relative to the former.

This process will be explained more in detail by referring to FIGS. 11 through 19.

Figure 11:
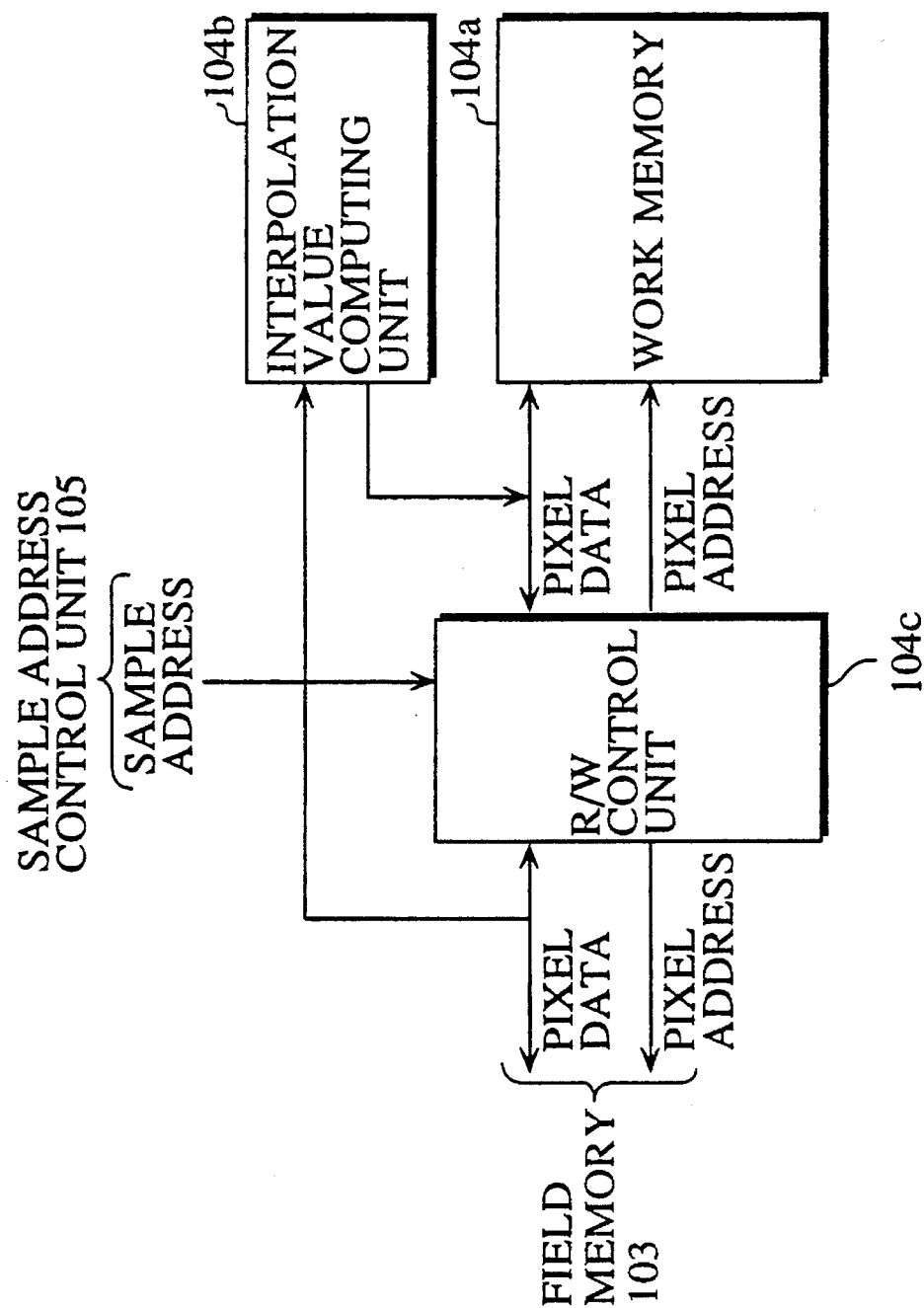
FIG. 11 is a block diagram depicting a zoom processing unit in the pre-coding processing unit.

FIG. 11 is a block diagram depicting a structure of the zoom processing unit 104. The zoom processing unit 104 comprises a work memory 104a, an interpolation value computing unit 104b, and a reading writing (R/W) control unit 104c.

The work memory 104a has a memory capacity of one field and stores data necessary for the zoom process.

The interpolation value computing unit 104b computes a pixel value to be interpolated by referring to neighboring pixels during the zoom-in process.

The R/W control unit 104c reads out pixels from the field memory 103, and writes them into their respective sample addresses in either the field memory 103 or work memory 104a in two steps: vertically and horizontally. For example, the R/W control unit 104c reads out a pixel P located at (x, y) in the reference field, and stores the pixel P at its vertical sample address (x, $[a_v y+b_v]$) in the work memory 104a or field memory 103 first, thus zooming the pixel P vertically. Note that a value in the brackets [] has only an integer like Gauss' notation: [1.245] will be 1, [2.899] will be 2, and [−3.555] will be −4. Then, the R/W control unit 104c reads out the pixel P and stores the pixel P at its horizontal sample address ($[a_h+b_h]$, y) in the work memory 104a or field memory 103 again, thus zooming the pixel P horizontally this time. The R/W control unit 104c also stores an interpolation value computed by the interpolation computing unit 104b when the reference field is zoomed out. The R/W control unit 104c also interpolates pixel value for eliminated pixels when the reference field is zoomed out: it uses a value having a larger coefficient to the sample field, such as a pixel value on the adjacent line or a corresponding pixel value in the sample field.

The sample address control unit 105 outputs a sample address to the zoom processor 104 in accordance with the zoom coefficients computed by the zoom coefficient computing unit 102 when the reference field is zoomed relative to the sample field. The sample address referred herein represents vertical and horizontal addresses that respectively map to (x, y) in the reference field, i.e., (x, $V_v$)y)) and ($V_h(x)$, y).

Figure 12:
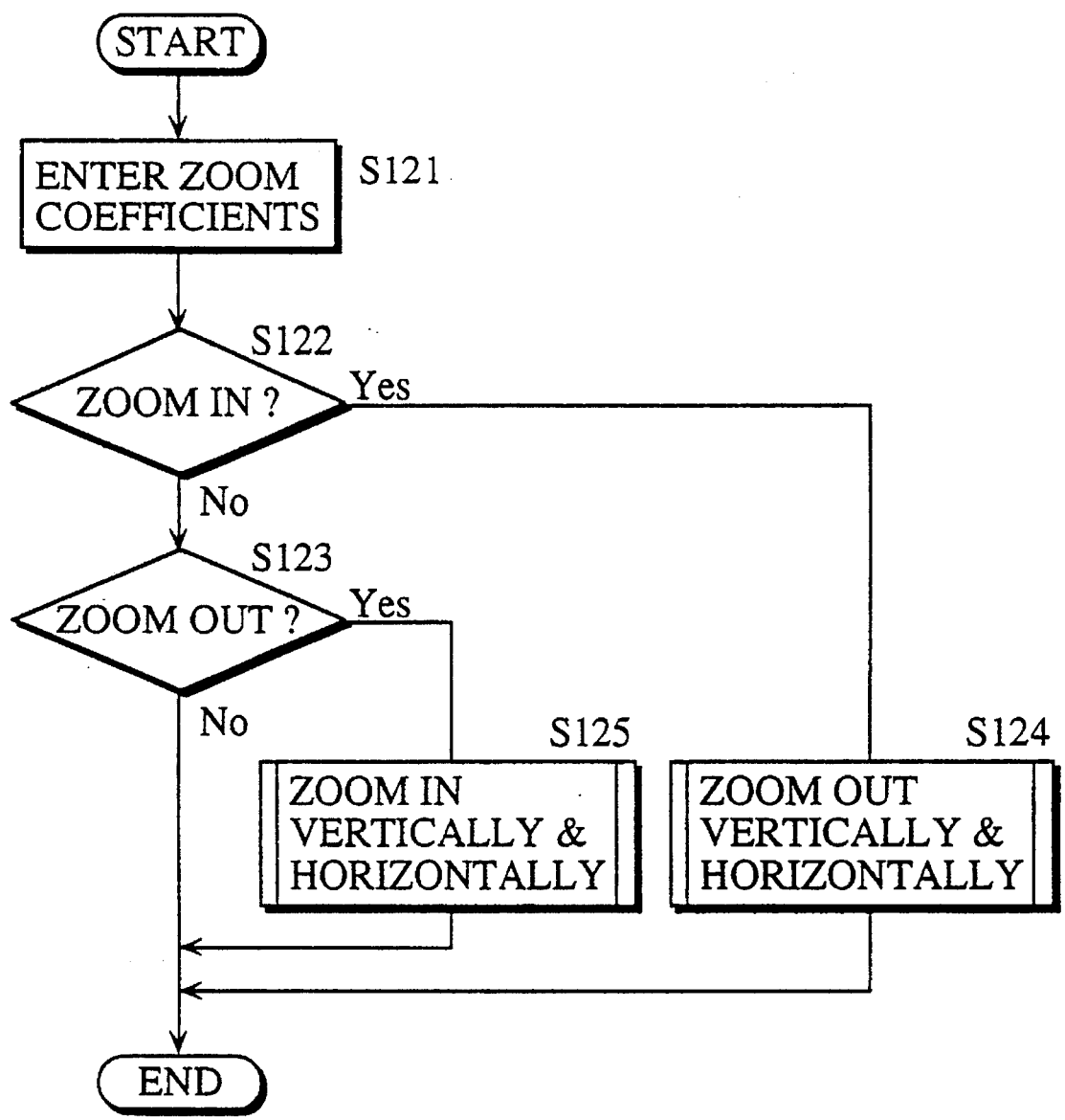
FIG. 12 is a flowchart detailing the operation of the pre-coding processing unit.

FIG. 12 is a flowchart detailing the operation of the zoom processing unit 104 and sample address control unit 105.

The sample address control unit 105 receives the zoom coefficients from the zoom coefficient computing unit 102 (Step 121), and determines whether the reference field is zoomed in or out relative to the sample field (Steps 122, 123). When the reference field is zoomed in relative to the sample field, the sample address control unit 105 activates the zoom processing unit 104 which accordingly zooms out the reference field vertically and horizontally by eliminating some pixels (Step 124). On the other hand, when the reference field is zoomed out relative to the sample field, the sample address control unit 105 activates the zoom processing unit 104 which accordingly zooms in the reference field vertically and horizontally by interpolating some pixels (Step 125). When the sample address control unit 105 receives a O-zoom coefficient, the sample address control unit 105 does not activate the zoom processing unit 104 and ends the operation.

Step 124, where the reference field is zoomed out, will be described more in detail by referring to FIGS. 13A, 13B, 14A, and 14B.

FIGS. 13A, 13B explain a principle of how the reference field will be zoomed out with the vertical zoom coefficients. In FIG. 13A, $y_1, y_2, y_3, y_4$ are vertical addresses, $[a_v(y_1)+b_v]$, $[a_v(_2)+b_v]$, $[a_v(y_3)+b_v]$, $[a_v(y_4)+b_v]$ are their respective sample addresses as a result of the vertical zoom-out process. Since the sample addresses have only integers, some of them may have a same value.

Assume that $[a_v(y_2)+b_v]$, $[a_v(y_3)+b_v]$ have a same value, then the pixels on a line at $y_2$ in the reference field are written into $[a_v(_2)+b_v]$, and the pixels on another line at $y_3$ are written into $[a_v(y_3)+b_v]$; the pixels on the $y_3$ lines are written onto those of the $y_2$ line, eliminating the pixels on the $y_1$ lines. Thus, the reference field in FIG. 13A is zoomed out as shown in FIG. 13B. Since the ratio of elimination is directly proportional to the zoom coefficients, the reference field size is resumed to the sample field size as a result. The reference field is zoomed out with the horizontal zoom coefficients in the same way.

However, the above-described process eliminates all the pixels on one line (pixels 10, 11, ..., 19), and for this reason, the edge of the image or a fine line may not be reproduced clearly, deteriorating image quality. To solve this problem, the above-described process is improved in this embodiment, which will be explained by referring to FIGS. 14A, 14B.

In the improved process, the pixels are eliminated dependent on whether their addresses have even or odd numbers, so that they are eliminated in zig-zag as shown in FIG. 14A, where the eliminated pixels are shaded.

Assume that $[a_v(y_2)+b_v]$, $[a_v(y_3)+b_v]$ have a same value, then the pixels on a line at $y_2$ in the reference field are written into $[a_v(y_2)+b_v]$, but unlike the principle process, the pixels on another line at $y_3$ are written into $[a_v(y_3)+b_v]$ only when their address numbers are odd, eliminating the pixels on two lines in zig-zag. Thus, the reference field in FIG. 14A is zoomed out as shown in FIG. 14B. The reference field is zoomed out with the horizontal zoom coefficients in the same way. The image quality in the reproduced image can be upgraded by the zig-zag pixel elimination.

Figure 15:
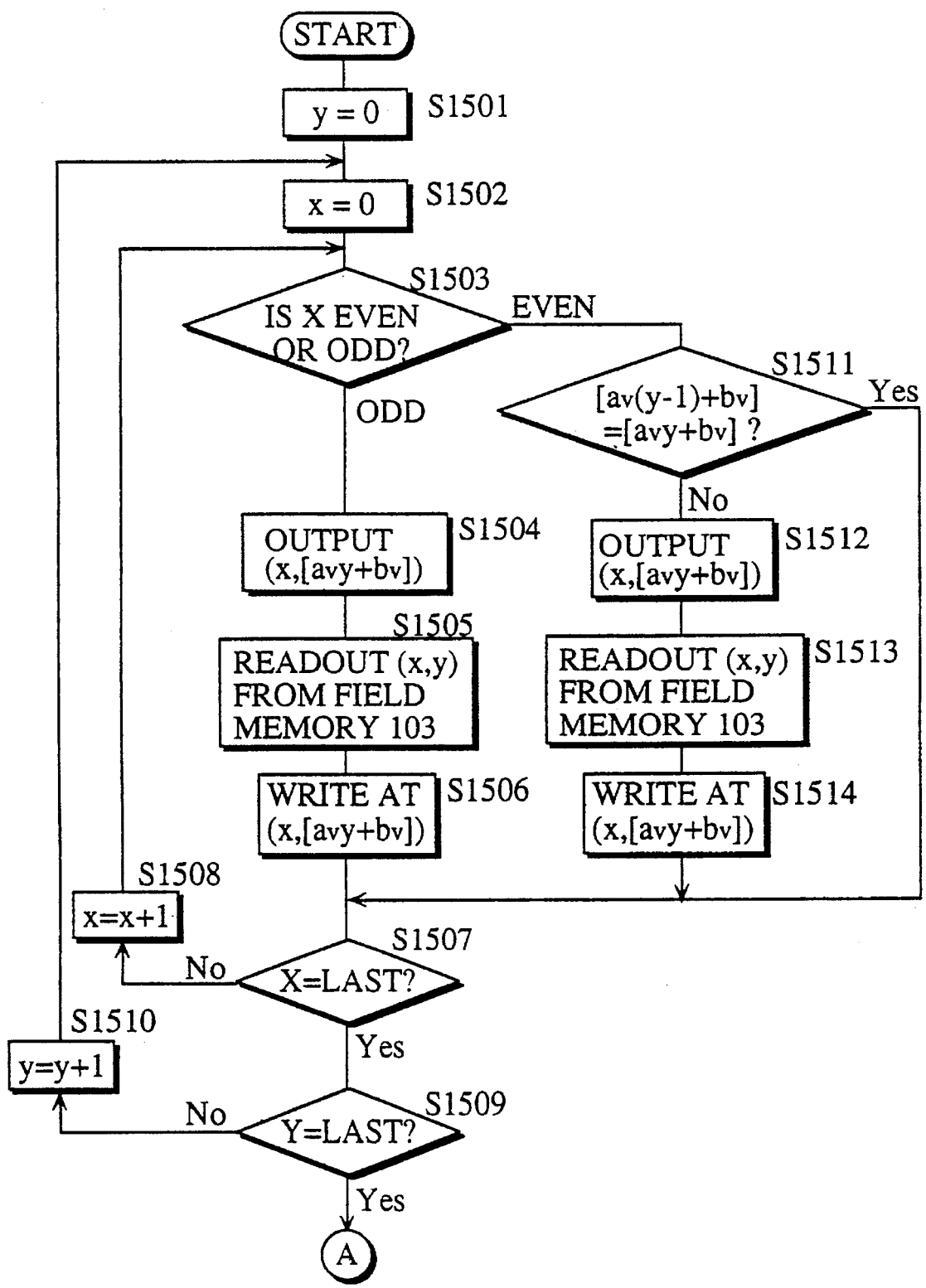
FIG. 15 is a flowchart detailing a vertical zoom-out process of the pre-coding processing unit.
Figure 16:
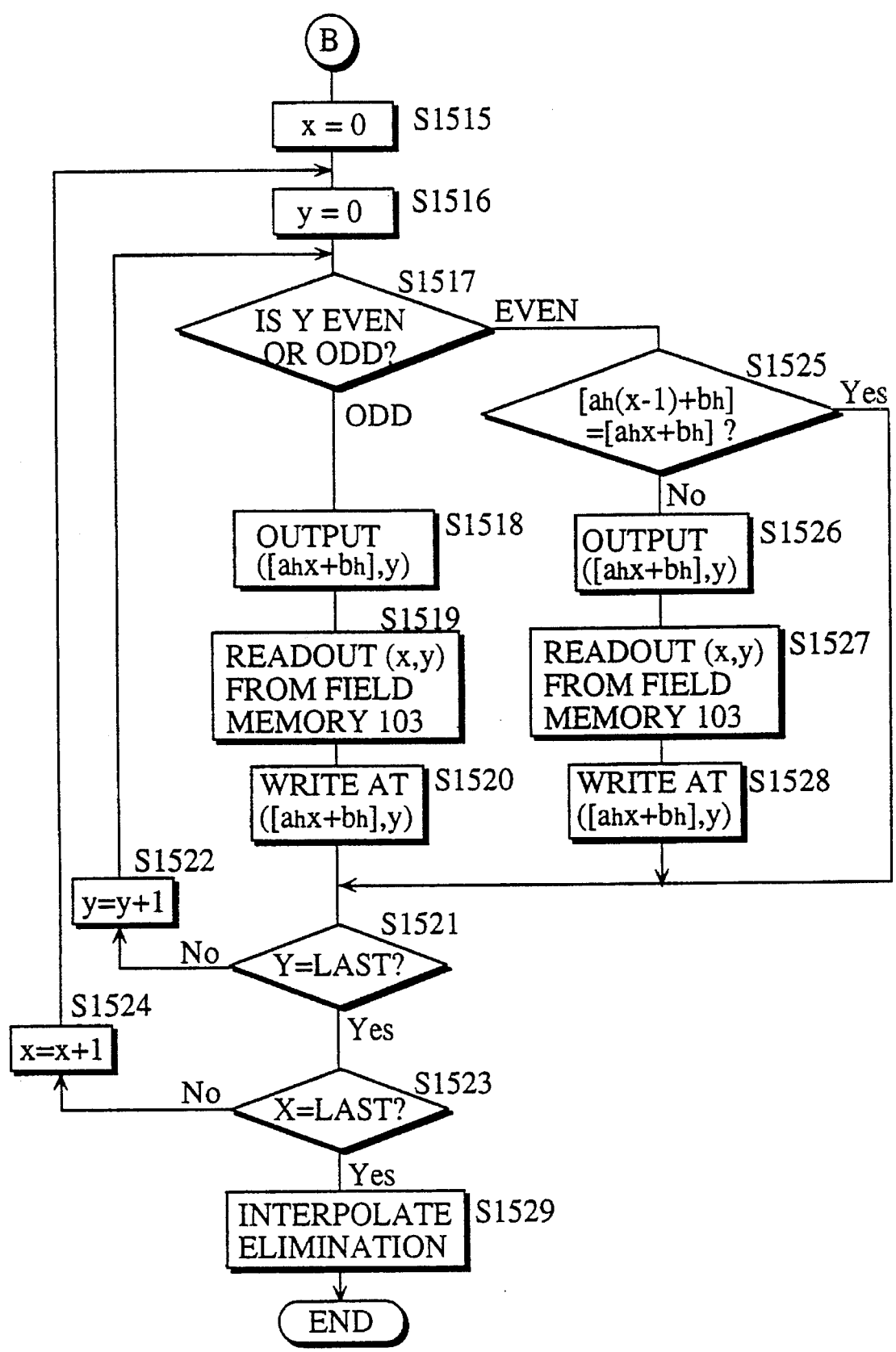
FIG. 16 is a flowchart detailing a horizontal zoom-out process of the pre-coding processing unit.

The above process will be detailed by the flowcharts in FIGS. 15, 16.

The sample address control unit 105 initializes both the pixel addresses (x, y) in the reference field to 0 (Steps 1501, 1052), and determines whether the horizontal address x has an even or odd number (Step 1503).

When x has an odd number, the sample address control unit 105 computes a sample address in the zoomed-out reference field, (x, $[a_v y+b_v]$), using the vertical coefficients received from the zoom coefficient computing unit 102. Then, the sample address control unit 105 sends the sample address thus computed and the original address (x, y) to the zoom processing unit 104 (Step 1504). Accordingly, the zoom processing unit 104 reads out the pixel data at (x, y) from the field memory 103 (Step 1505), and writes the pixel data at the sample address (x, $[a_v y+b_v]$) in the field memory 103 (Step 1506), notifying the sample address control unit 105 when the writing is completed. Subsequently, the sample address control unit 105 checks whether x is the last address on the line, indicated as HPIX-1 in FIG. 8B. If not, the sample address control unit 105 increments x to return to Step 1503.

When x has an even number, the sample address control unit 105 checks whether the vertical sample address $[a_v y+b_v]$ matches with $[a_v(y-1)+b_v]$ which is the vertical sample address for a preceding line y−1. When they do not match, no pixels are eliminated (Step 1511), and the sample address control unit 105 proceeds to Steps 1512 through 1514, which respectively correspond to 1504 through 1506.

on the other hand, when $[a_v y + b_v]$ and $[a_v(y-1) + b_v]$ match, the sample address control unit 105 skips Steps 1512 through 1514 and proceeds to Step 1507, so that the pixels are eliminated in zig-zag as shown in FIG. 14B.

When x reaches the last address on the line (Step 1507), the sample address control unit 105 checks whether y is the last address indicated as VLINE-1 in FIG. 8B. If not, the sample address control unit 105 increments y to return to Step 1502; otherwise, it completes the vertical zoom-out process.

Accordingly, the sample address control unit 105 and zoom processing unit 104 complete the horizontal zoom-out process in the same way as the vertical zoom-out process by proceeding to Steps 1515 through 1528. Further, the sample address control unit 105 interpolates the pixels for the pixel line eliminated as the result of the zoom-out process (Step 1529). For example, an adjacent pixel line or a corresponding pixel line on the sample field is interpolated to keep a correlation between the sample field and resulting zoomed-out reference field relative to the eliminated pixel line.

Next, Step 125, where the reference field is zoomed in, will be described more in detail by referring to FIGS. 17A, 17B. In the drawing, $y_1, y_2, y_3, y_4$ are vertical addresses in the reference field, and $[a_v(y_1)+b_v], [a_v(y_2)+b_v], [a_v(y_3)+b_v], [a_v(y_4)+b_v]$ are their respective sample addresses as a result of the vertical zoom-in process. Since the sample addresses have integers only, they may not be sequential, and an address may be larger than its preceding address by more than two causing the zoomed-in field to have blanks (missing pixels) on the vertical pixel line.

Assume that $[a_v(y_2)+b_v]$ is larger than $[a_v(y_1)+b_v]$ by two, then the reference field shown in FIG. 17A is zoomed in as shown in FIG. 17B. Accordingly, the zoom processing unit 104 interpolates the pixels for the blanks. Since the ratio of interpolation is directly proportional to the zoom coefficients, the reference field size is resumed to the sample field size as a result. The reference field is zoomed in with the horizontal zoom coefficients in the same way.

Figure 18:
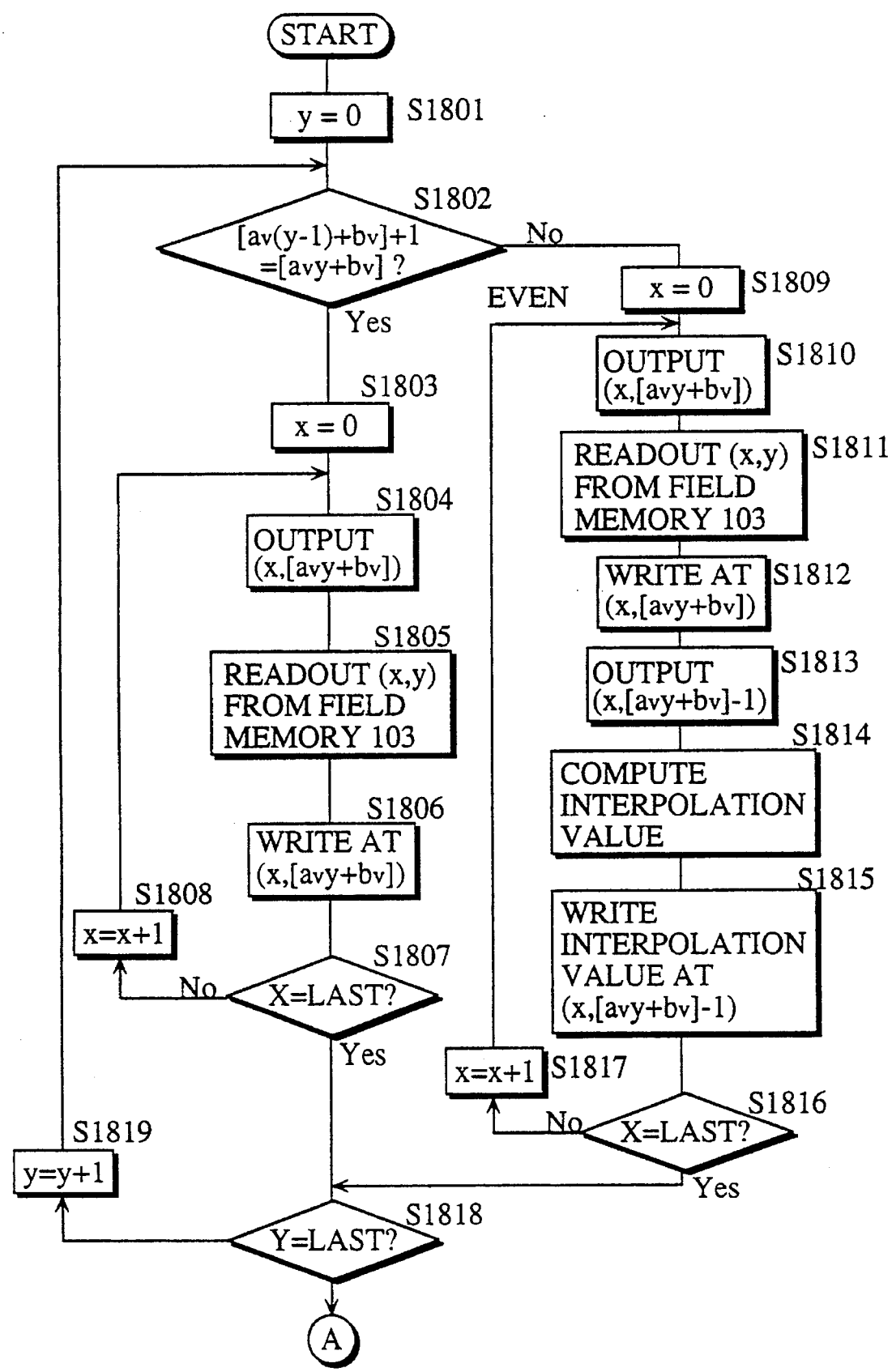
FIG. 18 is a flowchart detailing a vertical zoom-in process of the pre-coding processing unit.
Figure 19:
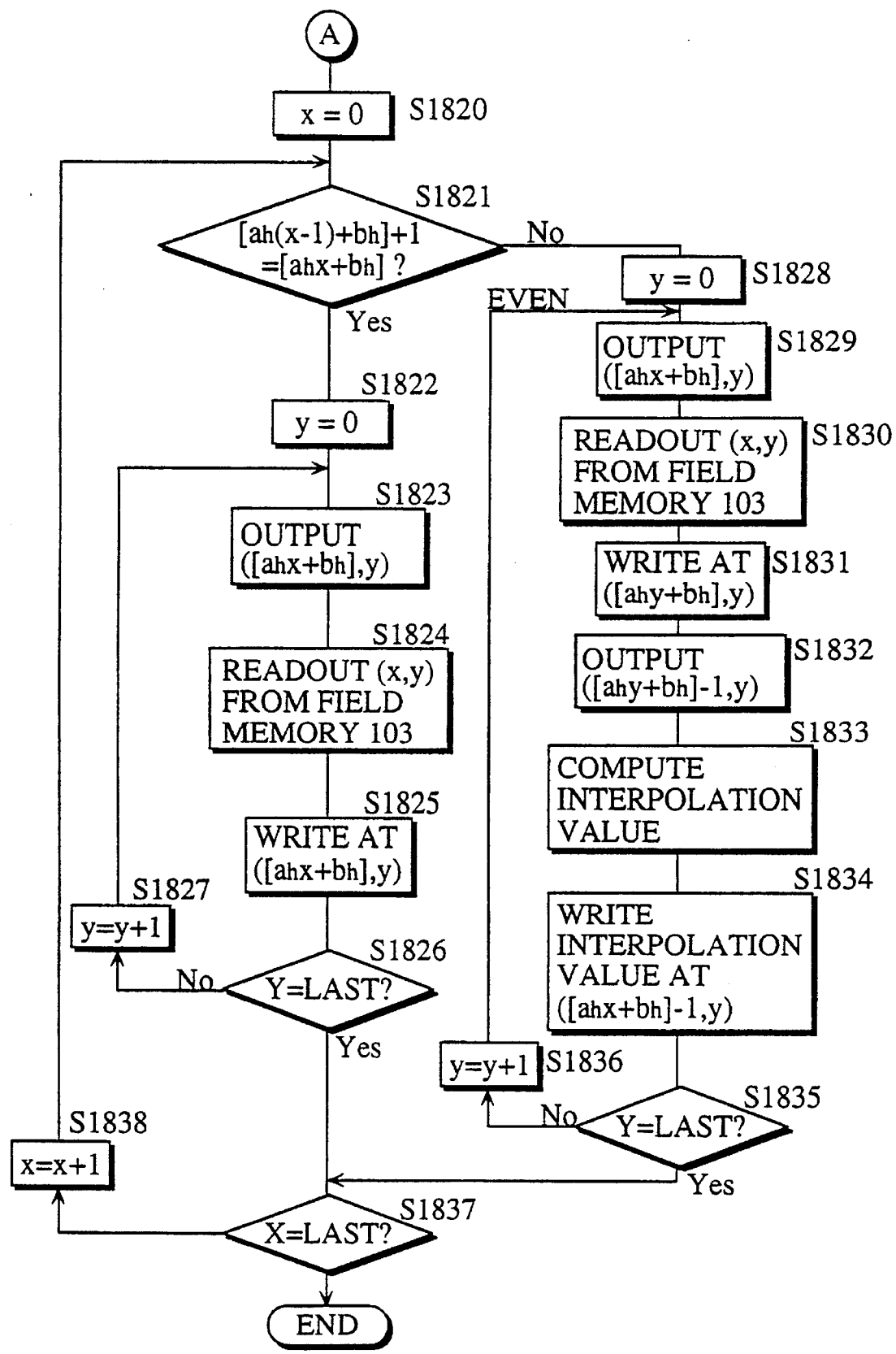
FIG. 19 is a flowchart detailing a horizontal zoom-in process of the pre-coding processing unit.

The above process will be detailed in the flowcharts in FIGS. 18, 19.

The sample address control unit 105 initializes a vertical pixel address y in the reference field to 0 (Step 1801), and checks whether its sample address $[a_v y+b_v]+1$ matches with $[a_v(y-1)+b_v]$ which is a sample address of a preceding line (y−1) (Step 1802); it checks whether there is any blank on the pixel line in the zoomed-in reference field.

When they match (no blanks checked), the sample address control unit 105 initializes the horizontal pixel address x to 0 (Step 1803), and computes a vertical sample address, $(x, [a_v y+b_v])$, using the vertical zoom coefficients. Then, the sample address control unit 105 outputs the same address thus computed with (x, y) to the zoom processing unit 104 (Step 1804). Accordingly, the zoom processing unit 104 reeds out pixel data at (x, y) from the field memory 103 (Step 1805), and writes the pixel data in the work memory 104a at the sample address $(x, [a_v y+b_v])$ (Step 1806), notifying the sample address control unit 105 when the writing is completed.

Then, the sample address control unit 105 increments x and returns to Step 1804 if x is not the last address indicated as HPIX-1 in FIG. 8B (Step 1807). The sample address control unit 105 repeats Steps 1804 through 1806 until x reaches the last address, writing all the pixels on one line into the work memory 104a.

On the other hand, when $[a_v y+b_v]$ and $[a_v(y-1)+b_v+1]$ do not match (blanks checked), the sample address control unit 105 initializes the horizontal address x to 0 (Step 1809), and computes a sample address, $(x, [a_v y+b_v])$, using the vertical zoom coefficients. Then, the sample address control unit 105 outputs the sample address thus computed and (x, y) to the zoom processing unit 104 (Step 1810).

Accordingly, the zoom processing unit 104 reads out the pixel data at (x, y) from the field memory 103 (Step 1811), and writes the pixel data at the sample address $(x, [a_v y+b_v])$ in the work memory 104a (Step 1812), notifying the sample address control unit 105 when the writing is completed.

Subsequently, the sample address control unit 105 outputs the address to be interpolated, $(x, [a_v y+b_v]-1)$, while sending an interpolation command to the interpolation value computing unit 104b (Step 1813). Accordingly, the interpolation value computing unit 104b computes the pixel data to be interpolated based on reference pixels (Step 1814); in this embodiment, two adjacent pixels, $(x, [a_v y+b_v]), (x, [a_v y+b_v]-2)$, are the reference pixels and the interpolation value is the average of the reference pixels. Accordingly, the R/W control unit 104c writes the interpolation data thus computed into $(x, [a_v y+b_v]-1)$ designated by the sample address control unit 105 (Step 1815). The sample control unit 105 repeats Steps 1810 through 1817 until x reaches the last address, writing one pixel line and interpolating the preceding line into the work memory 104a.

When x reaches the last address on the line (Step 1818), the sample address control unit 105 checks whether y reaches the last address indicated as VLINE-1 in FIG. 8 (Step 1818). If not, the sample address control unit 105 increments y to return to Step 1802. When y reaches the last address, the sample address control unit 105 ends the vertical zoom-in process.

Subsequently, the sample address control unit 105 and zoom processing unit 104 carry out the horizontal zoom-in process in the same way by proceeding to Steps 1820 through 1838.

POST-DECODING PROCESSING UNIT 2

The post-decoding processing unit 2 zooms in the reference field when it was zoomed out in the pre-coding processing unit 2, and zooms out when zoomed in after their coded data have been decoded. Hereinafter, the decoded reference field is referred to simply as to the decoded field.

Figure 5:
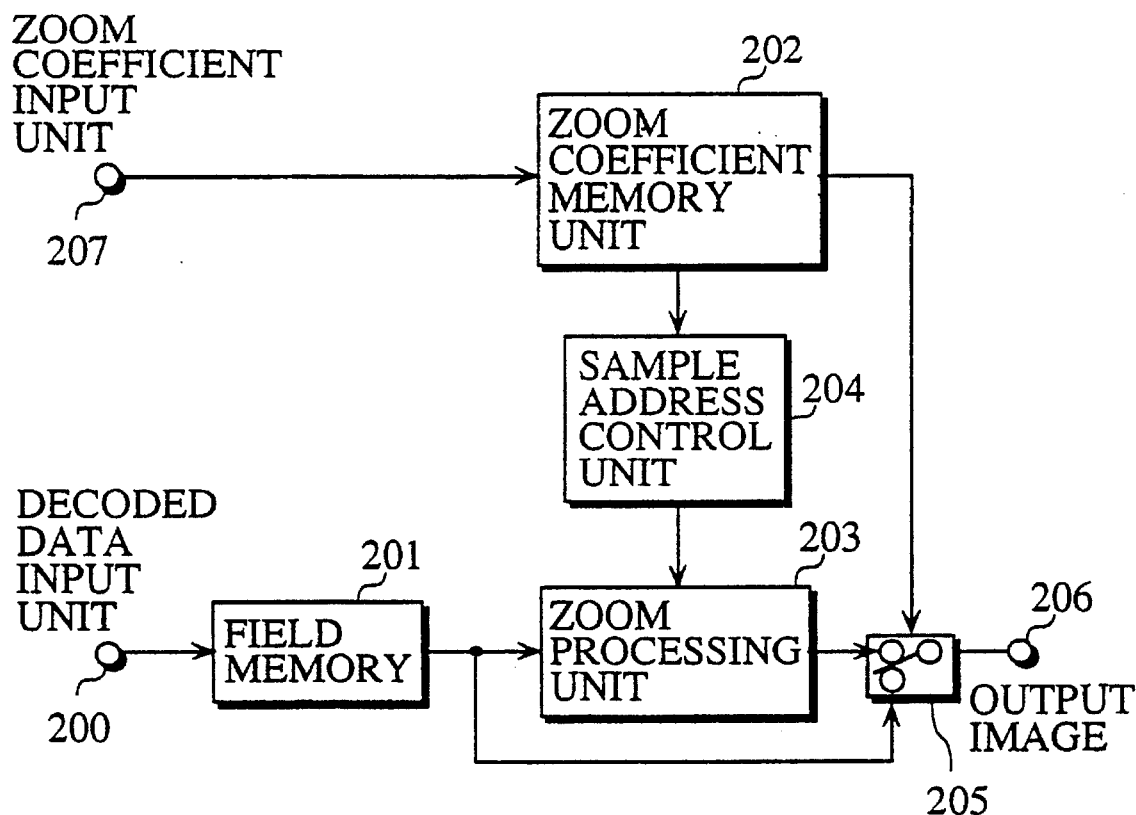
FIG. 5 is a block diagram depicting a post-decoding processing unit in the decoding unit.

As shown in FIG. 5. The post-decoding processing unit 2 comprises a decoded data input unit 200, a field memory 201, a zoom coefficient memory unit 202, a zoom processing unit 203, a sample address control unit 204, a switch unit 205, an output terminal 206, and a zoom coefficient input unit 207.

The decoded data input unit 200 receives the field data decoded by the decoding unit 7 shown in FIG. 2.

The zoom coefficient input unit 207 receives the zoom coefficients read out from the recording medium 5 by the readout unit 6. Note that the zoom coefficients are entered at the same timing when the corresponding decoded field data are entered in the decoded data input unit 200.

The zoom coefficient memory unit 202 stores the zoom coefficients temporarily.

The zoom processing unit 203 zooms in the decoded field when it was zoomed out in the pre-coding process, and zooms out when zoomed in based on the address generated by the sample address control unit 204. The zoom processing unit 203 comprises a work memory 203a, an interpolation value computing unit 203b, a R/W control unit 203c, which are not illustrated.

The sample address control unit 204 determines whether the decoded field must be zoom in or out with the zoom coefficients from the zoom coefficient memory unit 202; if O-zoom coefficients are entered for the decoded field data, no zoom process will be carried out. Further, the sample address control unit 204 outputs the sample address when the decoded field in the field memory 201 was zoomed during the pre-coding process based on the zoom coefficients stored in the zoom coefficient memory unit 202. The sample address referred herein represents vertical and horizontal addresses that respectively map to (x, y) in the decoded field as a result of the zoom process, i.e., (x, $-a_v(y)-b_v$) and ($-a_h(x)-b_v$, y).

Figure 20:
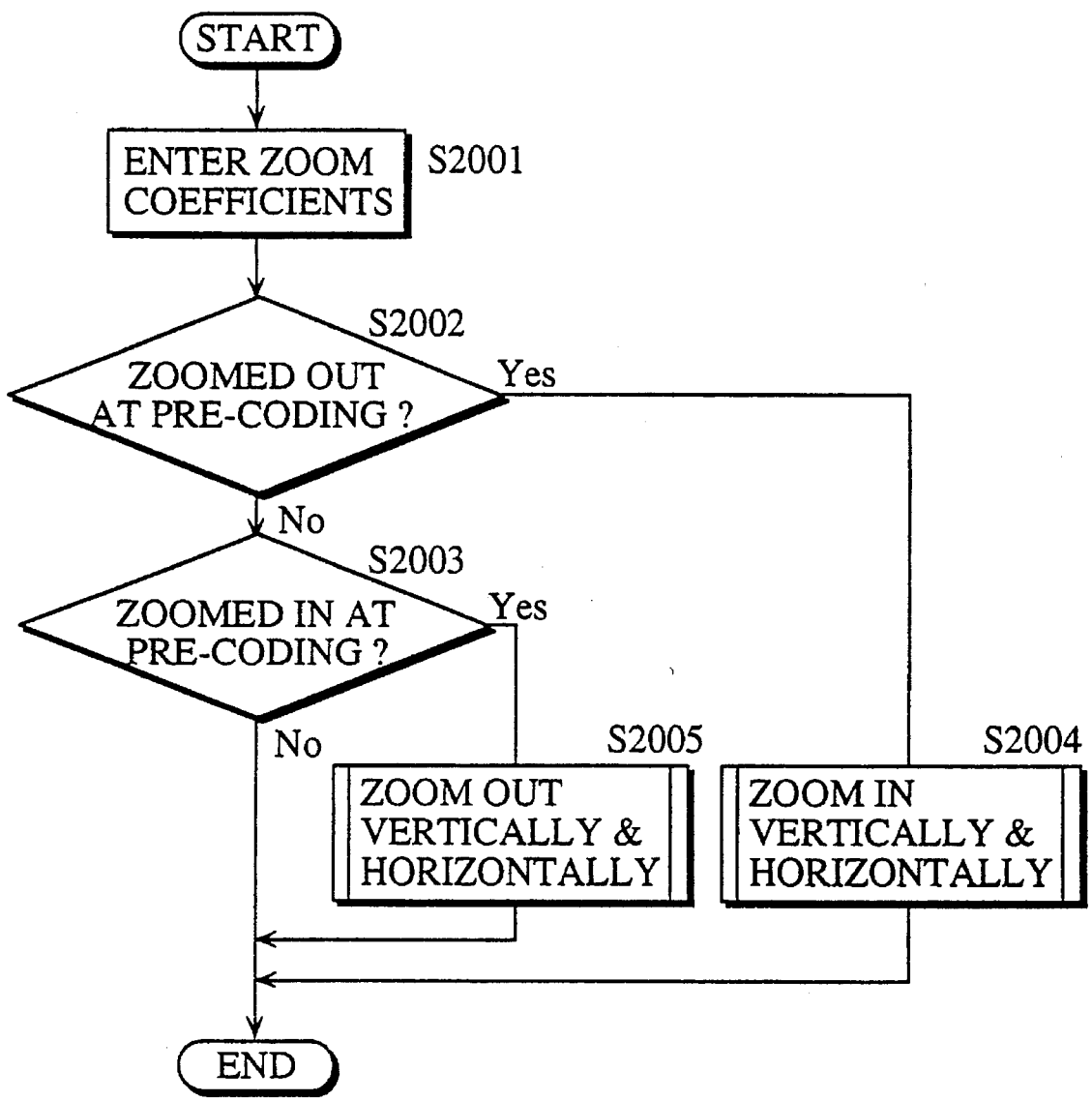
FIG. 20 is a flowchart detailing a zoom process of the post-decoding processing unit.

FIG. 20 is a flowchart detailing the zoom process of the zoom processing unit 203 and sample address control unit 204.

The sample address control unit 204 receives the zoom coefficients from the zoom coefficient memory unit 202 (Step 2001), and checks whether the decoded field was zoomed in or out in the pre-coding process (Steps 2002, 2003). When the decoded field was zoomed out, the sample address control unit 204 activates the zoom processor 203 which accordingly zooms in the decoded field vertically and horizontally by interpolating some pixels (Step 2004). When the decoded field was zoomed in, the sample address control unit 204 activates the zoom processor 203 which accordingly zooms out the decoded field vertically and horizontally by eliminating some pixels (Step 2005). The sample address control unit 204 does not activate the zoom processor 203 when it has received a O-zoom coefficient.

Step 2004, where the decoded field is zoomed in, is explained more in detail by referring to FIGS. 13C, 13D, 14C, 14D.

FIGS. 13C, 13D explain a principle of how the decoded field is zoomed in with the vertical zoom coefficients. In FIG. 13C, $y_1 y_2$, $y_3$, $y_4$ are the vertical address, and $[-a_v(y_1)-b_v]$, $[-a_v(y_2)-b_v]$, $[-a_v(y_3)-b_v]$, $[-a_v(y_4)-b_v]$ are their respective vertical sample addresses as a result of the zoom-in process. Since the sample addresses have integers only, they may not be sequential, and an address may be larger than its preceding address more than two.

Assume that $[-a_v(y_2)-b_v]$ is larger than $[-a_v(y_1)-b_v]$ by two. Then, the decoded field shown in FIG. 13C is zoomed in as shown in FIG. 13D, leaving one blank pixel line, and the blank pixel line is interpolated to complete the zoomed-in process. Since the zoom-in ratio is given by inverse functions relative to the linear functions in Equations (1), (2), the decoded field size is resumed to its original size, or the reference field size before it was zoomed out in the pre-coding process. The decoded field is zoomed in with the horizontal zoom coefficients in the same way.

Like in the pre-coding process, the above zoom-in process is improved, which will be explained by referring to FIGS. 14C, 14D.

Assume that $[-a_v(y_2)-b_v]$ is larger than $[-a_v(y_1)-b_v]$ by two. Then, the sample address control unit 204 outputs a sample address $[-a_v(y_2-1)-b_v]-2$ (=$[-a_v(y_1)-b_v]+2$) for the vertical address $y_2$ when x has an odd number, and a sample address $(-a_v(y_2-1)-b_v]+1$ (=$[-a_v(y_1)-b_v]+1$) when even number. Under these conditions, the zoom processing unit 203 writes the pixels on a line at $y_2$ into the above sample addresses into the work memory 203a depending on their address numbers. As a result, the pixels are written in zig-zag, ($_{20l}{}^{11}$, $_{,22}{}^{13}$, . . . , $_{28}{}^{19}$), as shown in FIG. 14D within circles.

Further, the sample address control unit 204 outputs the pixel address for the zig-zag blanks, while outputting an interpolation command to the interpolation value computing unit 203b, so that it computes the interpolation value. Accordingly, the zoom processing unit 203 writes the interpolation value thus computed into the sample addresses for all the blanks in zig-zag, ($^{10}{}_{,21}$, $^{12}{}_{,23}$, . . . , $^{18}{}_{,29}$) as shown in FIG. 14D in shade, completing the zoomed-in process.

Figure 21:
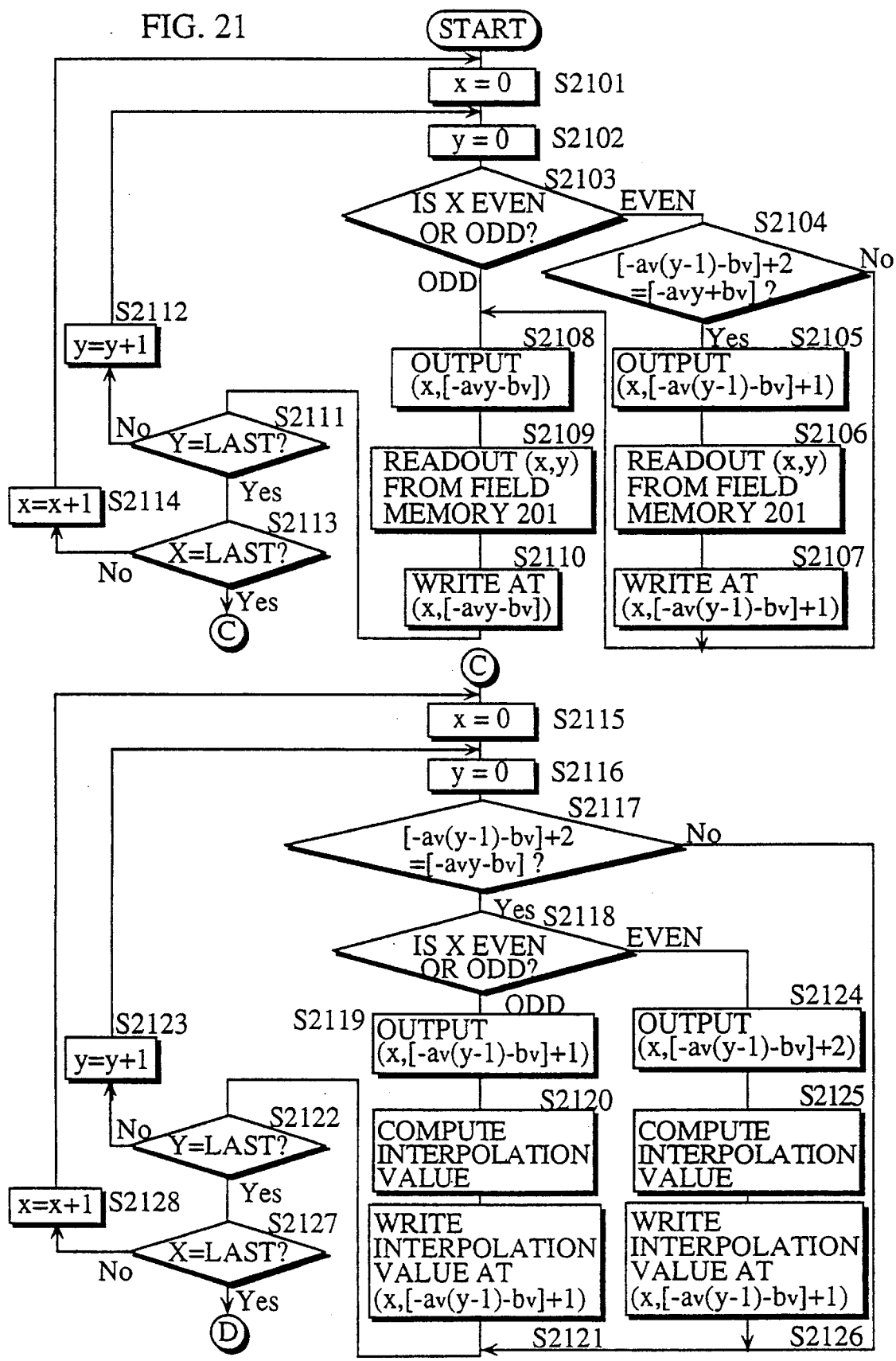
FIG. 21 is a flowchart detailing a vertical zoom-in process of the post-decoding processing unit.
Figure 22:
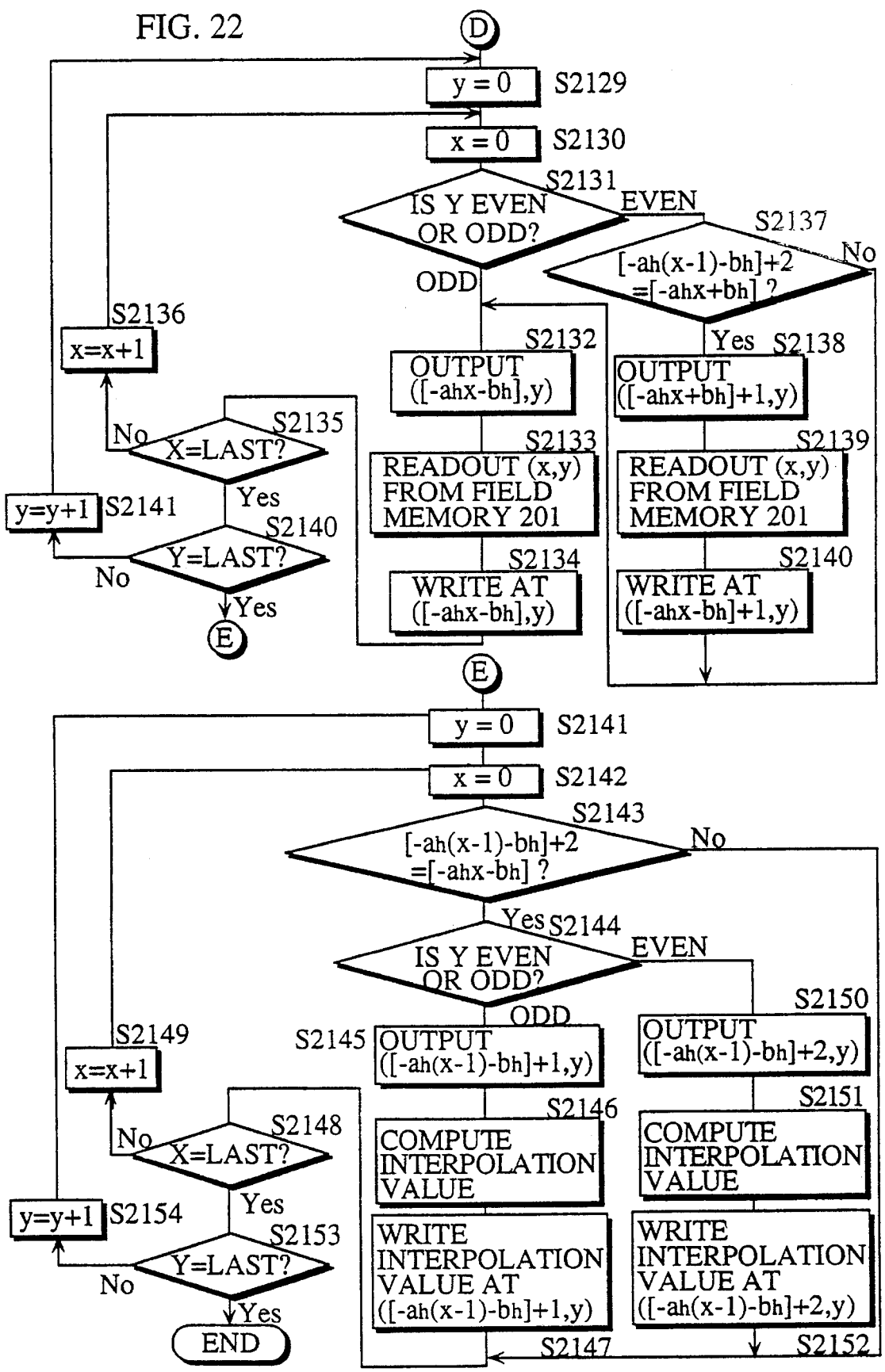
FIG. 22 is a flowchart detailing a horizontal zoom-in process of the post-decoding processing unit.

The above process will be detailed by flowcharts in FIGS. 21, 22.

The sample address control unit 204 initializes the pixel addresses (x, y) in the decoded field to O (Steps 2101, 2102), and checks whether x has an even or odd number.

When x has an odd number, the sample address control unit 204 computes the sample address in the zoomed-in decoded field, (x, $[-a_v y-b_v]$), with the vertical zoom coefficients. Then, the sample address control unit 204 outputs the sample address with (x, y) to the zoom processing unit 203 (Step 2108). Accordingly, the zoom processing unit 203 reads out the pixel data at (x, y) from the field memory 201 (Step 2109), and writes the pixel data in the sample address (x, $[-a_v y-b_v]$) in the work memory 203a (Step 2110), notifying the sample address control unit 204 when the writing is completed. Accordingly, the sample address control unit 204 increments x to return to 2101 when x is not the last address indicated as HPIX-1 in FIG. 8B (Step 2112).

When x has an even number, the sample address control unit 203 checks whether $[-a_v y-b_v]$ matches with $[-a_v(y-1)-b_v+2]$ which is a value computed by adding two to a sample address in the zoomed-in decoded field for a preceding line (y-1) (Step 2104). When they match, the sample address control unit 204 computes a sample address for the preceding line (y-1) computed by adding one to (x, $[-a_v y-b_v]$). Then, the sample address control unit 204 outputs to the sample address and (x, y) to the zoom processing unit 203 (Step 2105). Accordingly, the zoom processing unit 203 reads out the pixel data at (x, y) from the field memory 201 (Step 2106), and writes the pixel data at the sample address (x, $[-a_v y-b_v]$) in the work memory 203a (Step 2107), leaving the zig-zag blanks in the zoomed-in decoded field.

When $[-a_v y-b_v]$ and $[-a_v(y-1)-b_v+2]$ do not match, the sample address control unit 204 skips Steps 2105 through 2107 to proceeds to Step 2108 through 2110 as was explained in the above.

The sample address control unit 204 checks whether y reaches the last address on one line within the decoded field (Step 2111). If not, the sample address control unit 204 increments y and return to Step 2102; otherwise, the sample address control unit 204 checks whether x is the last address or not (Step 2113). If not, the sample address control unit 204 increment x to return to Step 2101 until x reaches the last address, leaving the zig-zag blanks in the vertical zoom-in field.

Then, the sample address control unit 204 initializes (x, y) to 0 (Steps 2115, 2116), and checks whether $[-a_v y-b_v]$ matches with $(-a_v(y-1)-b_v[+2$ which is the value computed by adding two to the sample address of the preceding line (y-1) in the zoomed-in decoded field.

When $[-a_v y-b_v]$ and $[-a_v(y-1)-b_v]+2$ match, the sample address control unit 204 further checks whether horizontal addresses in the blanks have even or odd numbers (Step 2118).

When x has an odd number, the sample address control unit 204 computes the sample address of the preceding line (y−1) in the zoomed-in decoded field, by adding one to (x, [−$a_v$,y−$b_v$]). Then, the sample address control unit 204 outputs the sample address to the zoom processing unit 203 while sending an interpolation command to the interpolation value computing unit 203b (Step 2119). Accordingly, the interpolation value computing unit 203b computes the pixel data to be interpolated by referring to the reference pixels (Step 2120): as has been explained, the interpolation data is the average of the two adjacent pixels (x,[$a_v$y+$b_v$]), (x, [$a_x$y+$b_v$]−2). The zoom processing unit 203 writes the interpolation value thus computed into the work memory 203a at the sample address (x, [−$a_v$y−$b_v$]+1) (Step 2121).

When x has an even number, the sample address control unit 204 proceeds to Steps 2124 through 2126 which correspond to Steps 2119 through 2126, respectively. However, the sample address control unit 204 outputs (x, [−$a_v$y−$b_v$[+2) instead of (x, [−$a_v$y−$b_v$[+1).

When [−$a_v$y−$b_v$] and [−$a_v$(y−1)−$b_v$[+2 do not match, the sample address control unit 204 skips to Step 2122, for there is no blank to be interpolated.

The sample address control unit 204 and zoom processing unit 203 repeats the above steps until both x, y reach their respective last addresses to write the interpolation value in all the zig-zag blanks, competing the vertical zoom-in process (Steps 2122, 2123, 2127, 2128).

The horizontal zoom-out process, shown in FIG. 22, is carried out in the same way, and the explanation thereof is omitted.

Step 2005, where the decoded field is zoomed out, will be explained more in detail by referring to FIGS. 17C, 17D.

In FIG. 17C, $y_1$, $y_2$, $y_3$, $y_4$ are vertical addresses, and [−$a_v$($y_1$)−$b_v$], [−$a_v$($y_2$)−$b_v$], [−$a_v$($y_3$)−$b_v$], [−$a_v$($y_4$)−$b_v$] are their respective sample addresses as a result of the vertical zoomed-in process. Since the sample addresses have integers only, some may have a same value.

Assume that [−$a_v$($y_2$)−$b_v$], [−$a_v$($y_3$)−$b_v$] have the same value. Then, the pixels on line at $y_2$ are written into the sample address [−$a_v$($y_2$)−$b_v$], and also the pixels on line at $y_3$ are written into the sample address [−$a_v$($y_3$)−$b_v$]: the pixels on the $y_3$ line are written onto those on the $y_2$ line, eliminating the $y_2$ line. Since the ratio of elimination is directly proportional to the zoom coefficients, the reference field zoomed-in at the pre-coding process is zoomed out to its original size as shown in FIG. 17D.

Figure 23:
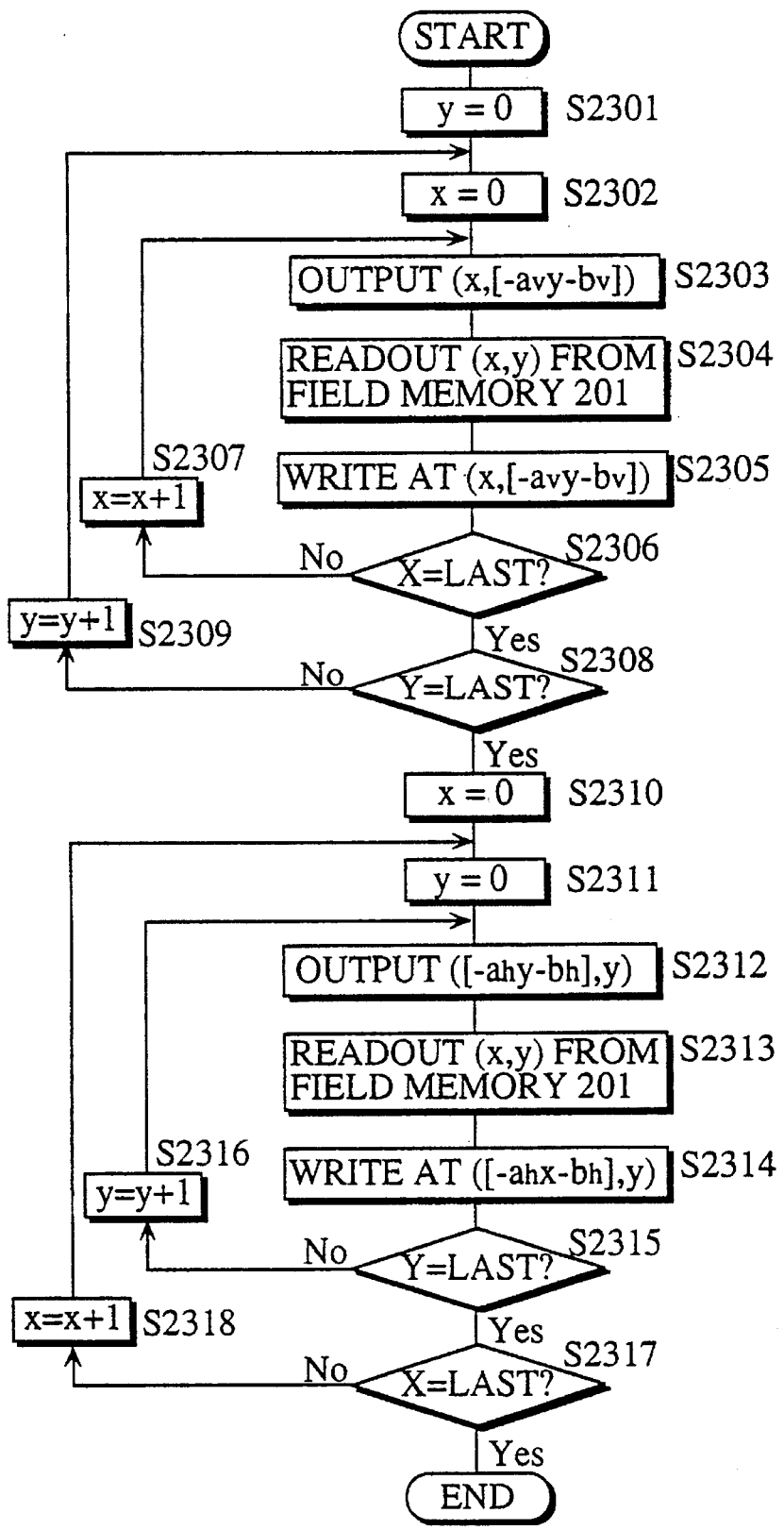
FIG. 23 is a flowchart detailing a zoom-out process of the post-decoding processing unit.

The above process will be detailed by a flowchart in FIG. 23.

The sample address control unit 204 initializes (x, y) on the decoded field to 0 (Steps 2301, 2302), and computes the vertical sample address (x, [−$a_v$y−$b_v$]) using the vertical zoom coefficients stored in the zoom coefficient memory unit 202, outputting the sample address and (x, y) to the zoom processing unit 203 (Step 2303).

The zoom processing unit 203 reads out pixel data at (x, y) from the field memory 201 (Step 2304), and writes the pixel data into the field memory 203a at the sample address (x, [−$a_v$y−$b_v$] (Step 2305), notifying the sample address control unit 204 when the writing is completed.

Accordingly, the sample address control unit 204 increments x to retain to Step 2303 when x is not the last address (Step 2307).

When x is the last address, the sample address control unit 204 checks whether y is the last address (Step 2308), and returns to Step 2129 until y reaches the last address (Step 2309), completing the vertical zoom-out process.

Subsequently, the sample address control unit 204 and zoom processing unit 203 carry out the horizontal zoom-out process in Step 2310 through 2317 in the same way.

Figures 24, 25:
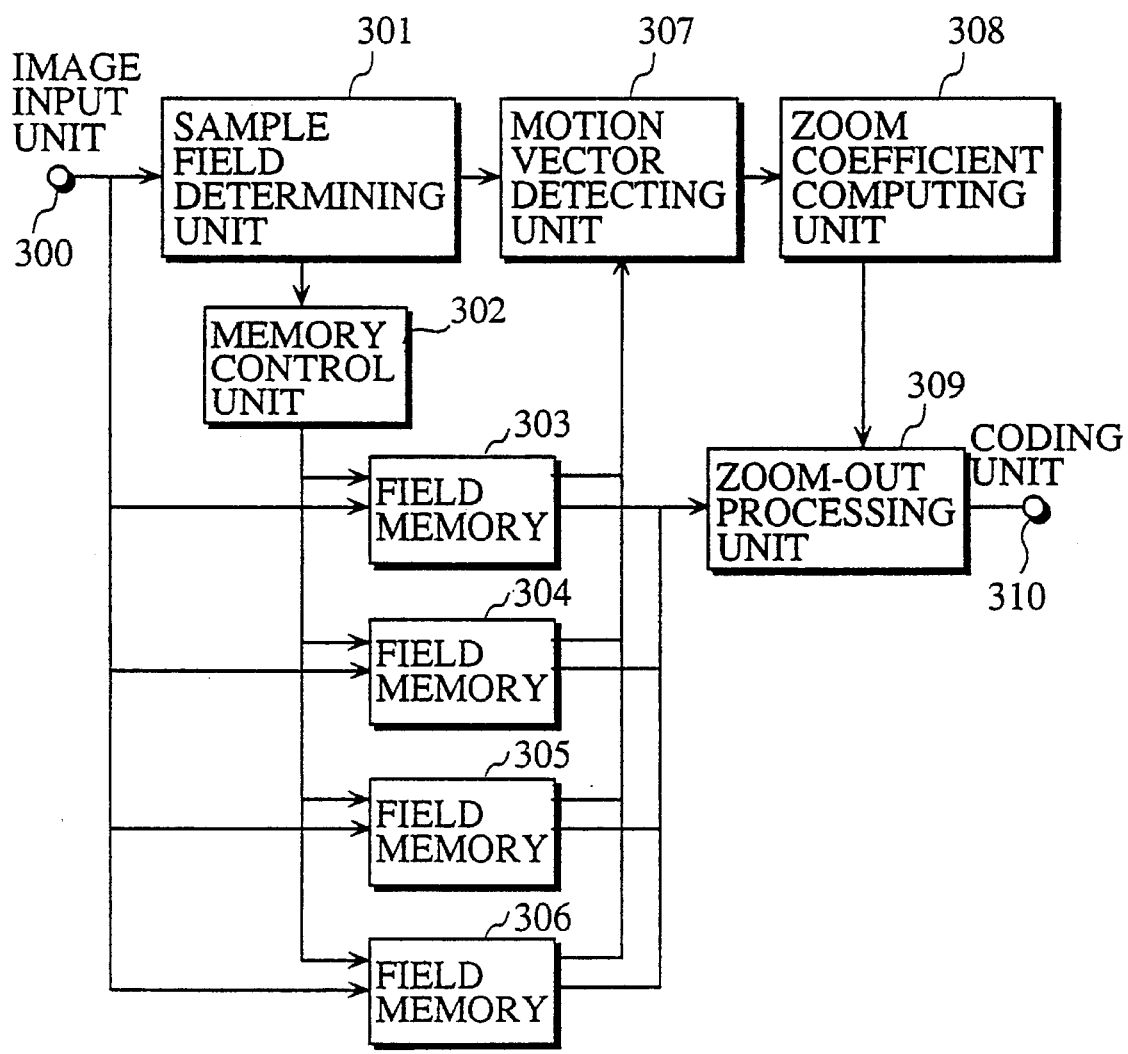
FIG. 24 is a view explaining an alternative zoom-out process of the pre-coding processing unit.
FIG. 25 is a block diagram showing a structure of the alternative pre-coding processing unit.

In the foregoing embodiment, the pixels are eliminated in zig-zag; however, other elimination methods are applicable on the condition that they do not eliminate vertically nor horizontally adjacent pixels. FIG. 24 shows an example of other methods, where three pixel lines make up a set and pixels that are not adjacent each other within the set are eliminated. In this case, a step where the vertical address is divided by 3 to check a reminder is added instead of Steps 1503, 1507 in FIG. 15.

The field group does not necessarily comprise four fields as shown in FIG. 6, and it may comprise at least two fields. However, making the field group with four fields is most preferable when taking into account a hardware size, processing time, and coding efficiency in the pre-coding process.

Any field in the field group maybe the sample field; it is preferable to choose the most zoomed-in field in the field group. Because by so doing, the edge or finesse of the pixel line will be clearly reproduced. This is because the pre-coding processing unit 1 only has to zoom the reference field while interpolating pixel data, and the post-decoding processing unit 2 only has to zoom out the reference field, losing any image data along all the processes.

FIG. 25 shows a structure of the pre-coding processing unit 1 in the above alternative case, which is identical with the one shown in FIG. 4 except that a sample field determining unit 301 determines the most zoomed out field in the field group whose four fields are respectively stored in field memories 303–306 as the sample field, and that the sample address control unit 105 is omitted. The sample address control unit 105 is omitted because no reference field will be zoomed out in the pre-coding process.

Although the present invention has been fully described by way of example with reference to the accompanying drawings, it is to be noted that various changes the modification will be apparent to those skilled in the art. Therefore, unless otherwise such changes and modifications depart from the scope of the present invention, they should be construed as being included therein.

What is claimed is:

1. A method of coding image data with coefficients between fields by increasing the coefficients prior to coding, the method comprising the steps of:

(1) detecting a motion vector in a reference field to a sample field to check whether the reference field is zoomed in or out relative to the sample field, data of the reference field being coded based on the sample field;

(2) zooming out the reference field when the reference field is zoomed in relative to the sample field, and zooming in the reference field when the reference field is zoomed out relative to the sample field according to the motion vector; and (3) coding the reference field after the reference field has been zoomed according to the motion vector in the second step.

2. The method of claim 1, wherein both the sample and reference fields comprise a set of alternative scan lines in case of a interlace display, and comprises one image's data otherwise.

3. The method of claim 1, wherein the first step includes the substep of checking a group consisting of a predetermined number of sequential fields to select a most zoomed-in field in the group as the sample field.

4. The method of claim 1, wherein a first field in the group is the sample field.

5. The method of claim 4, wherein the predetermined number is 4.

6. The method of claim 1, wherein the reference field is zoomed out by eliminating pixels that are not adjacent in one of a vertical direction and a horizontal direction in the second step.

7. The method of claim 6, wherein pixels in one line and one of a vertically and a horizontally adjacent line are eliminated in zig-zag in the second step.

8. The method of claim 6, wherein pixels are interpolated with a reference to neighboring pixel data when the reference field is zoomed in in the second step.

9. The method of claim 6, wherein pixels are interpolated with a reference to corresponding pixel data in an adjacent field within the group in the second step.

10. The method of claim 1, wherein the reference field is zoomed according to a direction and a size of the motion vector in the second step.

11. The method of claim 10, wherein the first step further includes the substep of checking whether the reference field is zoomed in or out relative to the sample field based on a direction of the motion vector.

12. The method of claim 11, wherein the second step includes the substeps of:

generating a second pixel address in a zoomed reference field according to the size and direction of the motion vector, the second pixel address mapping to a first pixel address in the reference field; and reading out pixel data at the first pixel address from the reference field to write the pixel data at the second pixel address.

13. The method of claim 12, wherein the second pixel address is generated in such a way that vertically and horizontally adjacent pixels are not eliminated when the reference field is zoomed out in the pixel-address-generating substep.

14. The method of claim 13, wherein the second pixel address is generated in such a way that pixels are eliminated in zig-zag in one pixel line and one of a vertically and a horizontally adjacent pixel line.

15. The method of claim 12, wherein a third pixel address is generated when the reference field is zoomed in in the pixel-address-generating substep, the third pixel address specifying an address where pixel data are to be interpolated, and wherein the pixel data are interpolated at the third pixel address in the read/write substep.

16. The method of claim 15, wherein pixels are interpolated with a reference to neighboring pixel data when the reference field is zoomed in in the second step.

17. The method of claim 15, wherein pixels are interpolated with a reference to corresponding pixel data in an adjacent field within the group in the second step.

18. The method of claim 1, wherein the first step includes the substeps of:

computing coefficients of an approximate equation based on the motion vector, which represent a first pixel address in the reference field and a second pixel address in a zoomed reference field, and wherein the reference field is zoomed according to a direction and a size of the motion vector in the second step.

19. The method of claim 18, wherein the first step further includes the substep of checking whether the reference field is zoomed in or out relative to the sample field based on a direction of the motion vector.

20. The method of claim 19, wherein the second step includes the substeps of:

generating the first and second pixel addresses with the approximate equation; and reading out pixel data at the first pixel address from the reference field to write the pixel data at the second pixel address.

21. The method of claim 20, wherein the second pixel address is generated in such a way that vertically and horizontally adjacent pixels are not eliminated when the reference field is zoomed out in the pixel-address-generating substep.

22. The method of claim 21, wherein the second pixel address is generated in such a way that pixels are eliminated in zig-zag in one pixel line and one of a vertically and a horizontally adjacent pixel line.

23. The method of claim 22, wherein a third pixel address is generated when the reference field is zoomed in in the pixel-address-generating substep, the third pixel address specifying an address where pixel data are to be interpolated, and wherein the pixel data are interpolated at the third pixel address in the read/write substep.

24. The method of claim 23, wherein pixels are interpolated with a reference to neighboring pixel data when the reference field is zoomed in in the second step.

25. The method of claim 23, wherein pixels are interpolated with a reference to corresponding pixel data in an adjacent field within the group in the second step.

26. A method of coding image data with coefficients between fields by increasing the coefficients prior to coding, the method comprising the steps of:

(1) detecting a motion vector in a reference field to a sample field;

(2) computing coefficients of an approximate equation based on the motion vector, which represent a first pixel address in the reference field and a second pixel address in a zoomed reference field;

(3) generating the first and second pixel addresses with the approximate equation;

(4) reading out pixel data at the first pixel address from the reference field to write the pixel data at the second pixel address;

(5) generating a third pixel address when the reference field is zoomed in, the third pixel address specifying an address where pixel data are to be interpolated;

(6) interpolating the pixel data at the third address; and (7) coding image data generated by one of the fourth step and sixth step.

27. A method of decoding coded data with zoom coefficients between fields when image data have been coded by a coding method which increases the coefficients prior to coding, the method comprising the steps of:

(1) decoding coded data into field data;

(2) generating a first pixel address in a decoded field and a second pixel address mapping to the first pixel address in a zoomed decoded field with the zoom coefficients;

(3) reading out pixel data at the first pixel address from the decoded field to write the pixel data at the second pixel address to zoom the decoded field;

(4) generating a third pixel address at which pixel data are interpolated when the decoded field is zoomed in; and (5) interpolating the pixel data at the third pixel address.

28. A coding apparatus for coding image data with coefficients between fields by increasing the coefficients prior to coding, the apparatus comprising:

means for temporarily storing a sample field;

means for temporarily storing a reference field which is to be coded based on the sample field;

means for detecting a motion vector in the reference field to the sample field to determine whether the reference field is zoomed in or out relative to the sample field;

means for zooming in the reference field when the reference field is zoomed out relative to the sample field, and for zooming out the reference field when the reference field is zoomed in relative to the sample field according to the motion vector; and means for coding the reference field after it has been zoomed according to the motion vector.

29. The apparatus of claim 28, wherein both the sample and reference fields comprise a set of alternative scan lines in case of a interlace display, and comprise one image's data otherwise.

30. The apparatus of claim 29, wherein the detecting means includes means for checking a group consisting of a predetermined number of sequential fields to select a most zoomed-in field in the group as the sample field.

31. The apparatus of claim 29, wherein a first field in the group is the sample field.

32. The apparatus of claim 31, wherein the predetermined number is 4.

33. The apparatus of claim 28, wherein the zooming means zooms out the reference field by eliminating pixels that are not adjacent in one of a horizontal direction and a horizontal direction.

34. The apparatus of claim 33, wherein the zooming means eliminates pixels in one line and one of a vertically and horizontally adjacent line in zig-zag.

35. The apparatus of claim 33, wherein the zooming means interpolates pixels by referring to neighboring pixel data when the zooming means zooms in the reference field.

36. The apparatus of claim 33, wherein the zooming means interpolates pixels by referring to corresponding pixel data in an adjacent field in the group.

37. The apparatus of claim 28, wherein the zooming means zooms in the reference field according to a direction and a size of the motion vector.

38. The apparatus of claim 37, wherein the detecting means further includes:

means for checking whether the reference field is zoomed in or out relative to the same field based on a direction of the motion vector.

39. The apparatus of claim 38, wherein the zooming means includes:

means for generating a second pixel address in a zoomed reference field according to the size and direction of the motion vector, the second pixel address mapping to a first pixel address in the reference field; and means for reading out pixel data at the first pixel address from the reference field storage means to write the pixel data at the second pixel address.

40. The apparatus of claim 39, wherein the pixel-address-generating means generates the second pixel address in such a way that vertically and horizontally adjacent pixels are not eliminated when the reference field is zoomed out.

41. The apparatus of claim 40, wherein the pixel-address-generating means generates the second pixel address in such a way that pixels are eliminated in zig-zag in one pixel line and one of a vertically and a horizontally adjacent pixel line.

42. The apparatus of claim 39, wherein pixel-address-generating means generates a third pixel address when the reference field is zoomed in, the third pixel address specifying an address where pixel data are to be interpolated, and wherein the read/write means interpolates the pixel data at the third pixel address.

43. The apparatus of claim 42, wherein the read/write means interpolates pixels by referring to neighboring pixel data when the reference field is zoomed.

44. The apparatus of claim 42, wherein the read/write means interpolates pixels by referring to corresponding pixel data in an adjacent field within the group.

45. The apparatus of claim 28, wherein the detecting means includes:

means for computing coefficients of an approximate equation based on the motion vector, which represent a first pixel address in the reference field and a second pixel address in a zoomed reference field, and wherein the zooming means zooms the reference field according to a direction and a size of the motion vector.

46. The apparatus of claim 45, wherein the detecting means further includes:

means for checking whether the reference field is zoomed in or out relative to the sample field based on a direction of the motion vector.

47. The apparatus of claim 46, wherein the zooming means includes:

means for generating the first and second pixel addresses with the approximate equation; and means for reading out pixel data at the first pixel address from the reference field to write the pixel data at the second pixel address.

48. The apparatus of claim 47, wherein the pixel-address-generating means generates the second pixel address in such a way that vertically and horizontally adjacent pixels are not eliminated when the reference field is zoomed out.

49. The apparatus of claim 48, wherein the pixel-address-generating means generates the second pixel address in such a way that pixels are eliminated in zig-zag in one pixel line and one of a vertically and a horizontally adjacent pixel line.

50. The apparatus of claim 49, wherein the pixel-address-generating means generates a third pixel address when the reference field is zoomed in, the third pixel address specifying an address where pixel data are to be interpolated, and wherein the read/write means interpolates the pixel data at the third pixel address.

51. The apparatus of claim 50, wherein the read/write means interpolates pixels by referring to neighboring pixel data when the reference field is zoomed in.

52. The apparatus of claim 50, wherein the read/write means interpolates pixels by referring to corresponding pixel data in an adjacent field within the group.

53. An apparatus of coding image data with coefficients between fields by increasing the coefficients prior to coding, the apparatus comprising:

means for temporarily storing a sample field;

means for temporarily storing a reference field which is to be coded based on the sample field;

means for detecting a motion vector in a reference field to a sample field;

means for computing coefficients of an approximate equation based on the motion vector, which represent a first pixel address in the reference field and a second pixel address in a zoomed reference field;

means for generating the first and second pixel addresses with the approximate equation;

means for reading out pixel data at the first pixel address from the reference field to write the pixel data at the second pixel address;

means for generating a third pixel address when the reference field is zoomed in, the third pixel address specifying an address where pixel data are to be interpolated;

means for interpolating the pixel data at the third address; and means for coding image data generated by one of the read/write means and pixel-data-interpolating means.

54. An apparatus of decoding coded data with zoom coefficients between fields when image data have been coded by a coding method which increases the coefficients prior to coding, the apparatus comprising:

means for decoding coded data into field data;

means for temporarily storing data of one decoded field;

means for temporarily storing the zoom coefficients associated with the decoded field data in the decoded-field-data storage means;

means for generating a first pixel address in the decoded field and a second pixel address with the coefficients, the second pixel mapping to the first pixel address in a zoomed decoded field;

means for reading out pixel data at the first pixel address from the decoded-field-data storage means to write the pixel data at the second pixel address to zoom the decoded field;

means for generating a third pixel address at which pixel data are interpolated when the decoded field is zoomed in; and means for interpolating the pixel data at the third pixel address.

* * * * *